(12) United States Patent
Kingery

(10) Patent No.: US 11,047,665 B2
(45) Date of Patent: Jun. 29, 2021

(54) VEHICLE MOUNTED STORAGE SYSTEMS

(71) Applicant: Kenneth G. Kingery, Mesa, AZ (US)

(72) Inventor: Kenneth G. Kingery, Mesa, AZ (US)

(*) Notice: Subject to any disclaimer, the term of this patent is extended or adjusted under 35 U.S.C. 154(b) by 150 days.

(21) Appl. No.: 15/891,340

(22) Filed: Feb. 7, 2018

(65) Prior Publication Data

US 2019/0017794 A1    Jan. 17, 2019

Related U.S. Application Data

(60) Provisional application No. 62/454,619, filed on Feb. 3, 2017, provisional application No. 62/455,876, filed on Feb. 7, 2017.

(51) Int. Cl.
*F42B 39/28* (2006.01)
*B60R 9/045* (2006.01)
*B60R 9/055* (2006.01)

(52) U.S. Cl.
CPC .............. *F42B 39/28* (2013.01); *B60R 9/045* (2013.01); *B60R 9/055* (2013.01)

(58) Field of Classification Search
CPC .......... F42B 38/28; F42B 39/00; F42B 39/24; F42B 39/26; F42B 39/30; F42B 39/20; B60R 9/045
USPC ..... 206/3, 317; 224/931, 912, 913; 220/561, 220/920, 558, 288, 291; 49/339, 343, 49/345
See application file for complete search history.

(56) References Cited

U.S. PATENT DOCUMENTS

| | | | | | |
|---|---|---|---|---|---|
| 343,259 | A | * | 6/1886 | Splitt | F42B 39/00 206/3 |
| H904 | H | * | 4/1991 | Schmidlin | 206/1.5 |
| 5,133,258 | A | * | 7/1992 | Rock | F42B 39/14 102/331 |
| 5,158,198 | A | * | 10/1992 | Melideo | B65D 88/126 220/263 |
| 5,945,624 | A | * | 8/1999 | Becker | F41A 9/64 89/1.59 |
| 6,516,567 | B1 | * | 2/2003 | Stone | E05F 15/622 296/55 |
| 7,395,922 | B1 | * | 7/2008 | Sinha | F42B 39/26 206/3 |
| 8,237,588 | B1 | * | 8/2012 | Fowler, IV | F42B 39/26 340/902 |
| 9,822,923 | B2 | * | 11/2017 | Woodbury, II | F16F 9/535 |

* cited by examiner

*Primary Examiner* — Rafael A Ortiz
(74) *Attorney, Agent, or Firm* — Bycer Law, PLC; Matthew L. Bycer

(57) ABSTRACT

A box or roof rack to safely store cans of ammunition of other military gear that is mounted on a military vehicle. Ammo container box may include a compression device to secure loaded materials, the compression device may be operated manually or through an electric motor, or other means. The roof rack may include telescoping overlapping plates for variable sizes of rack.

5 Claims, 45 Drawing Sheets

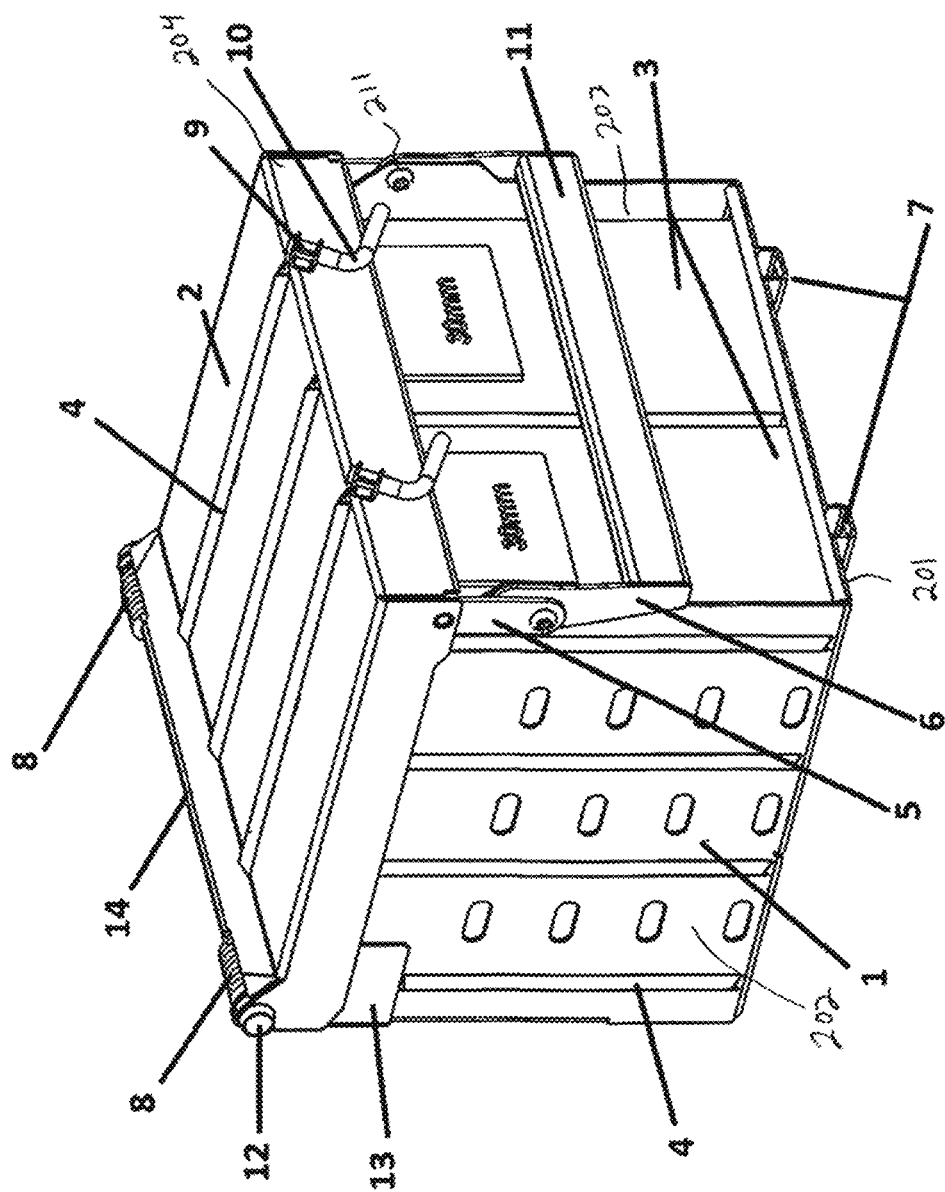

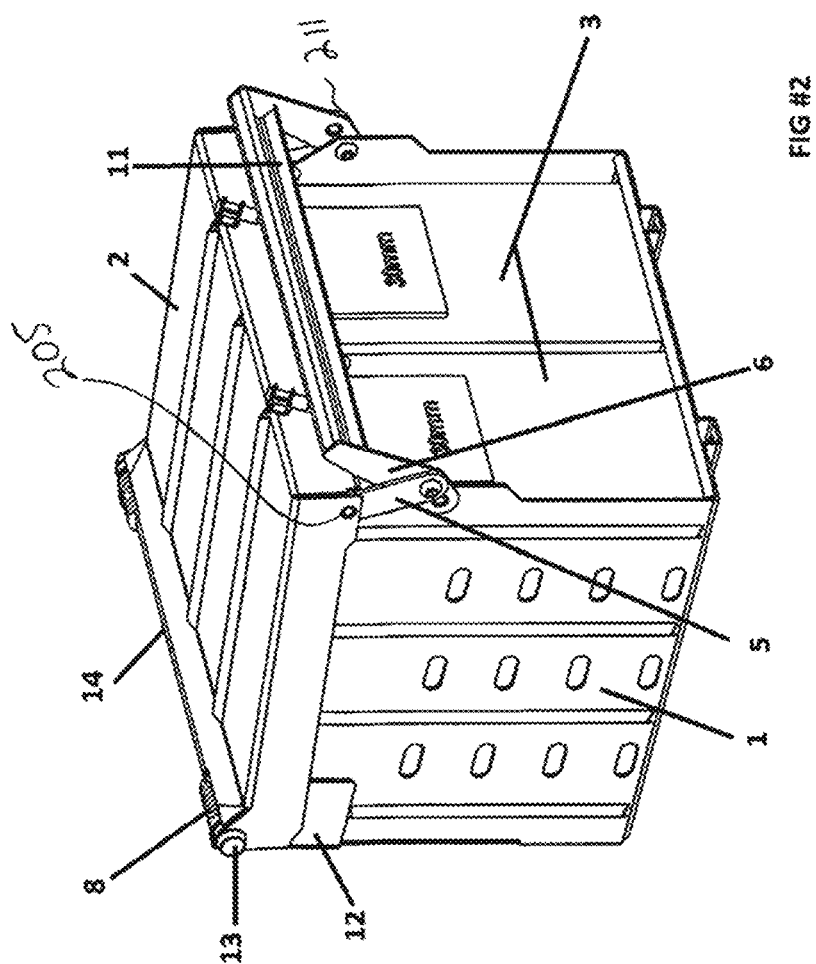

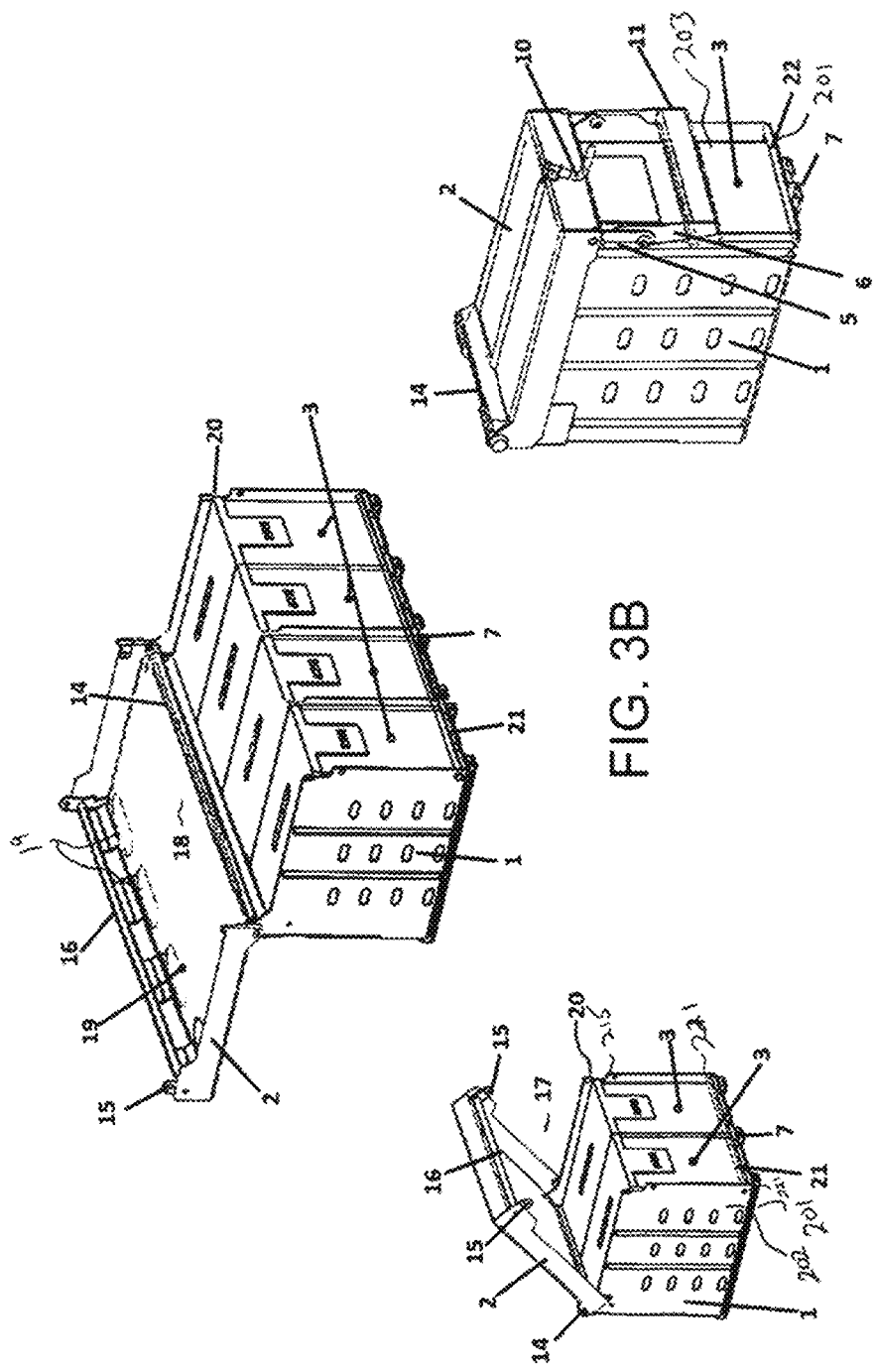

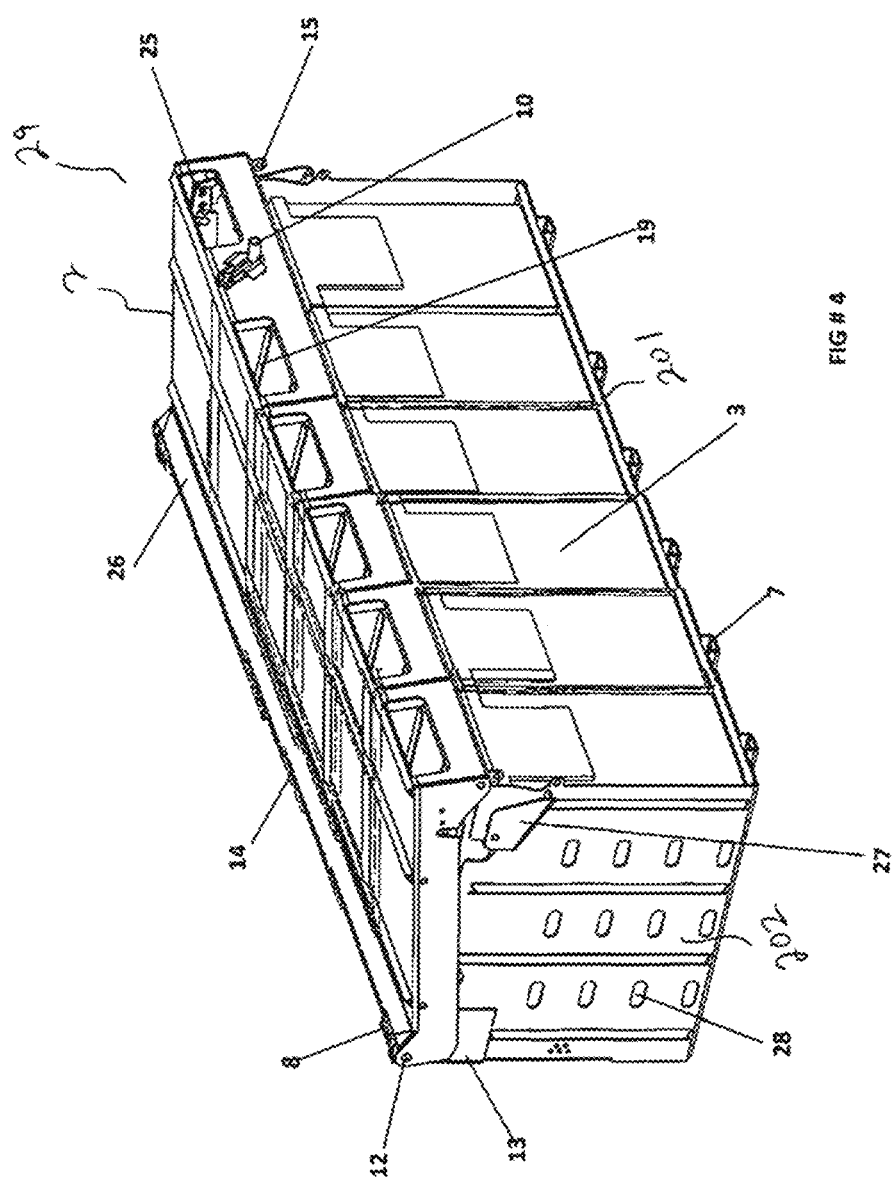
FIG # 4

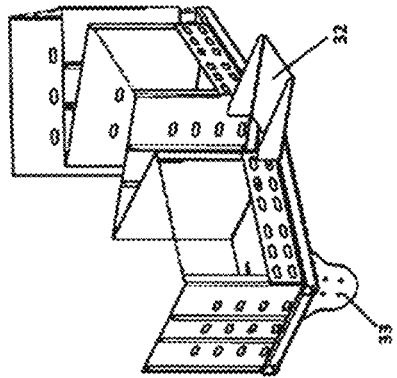
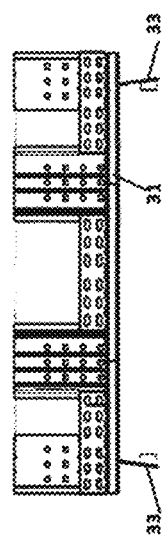
FIG. 5B
FIG. 5D
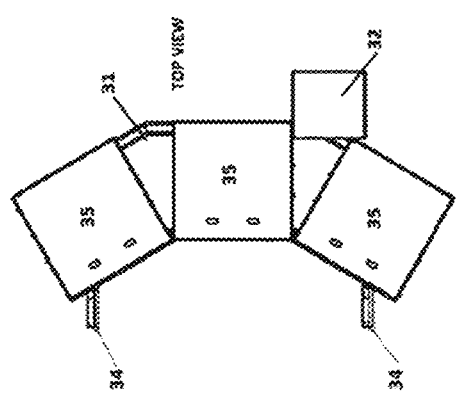
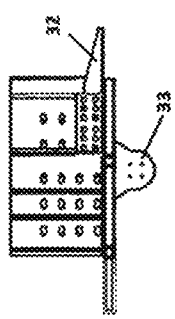
FIG. 5A
FIG. 5C

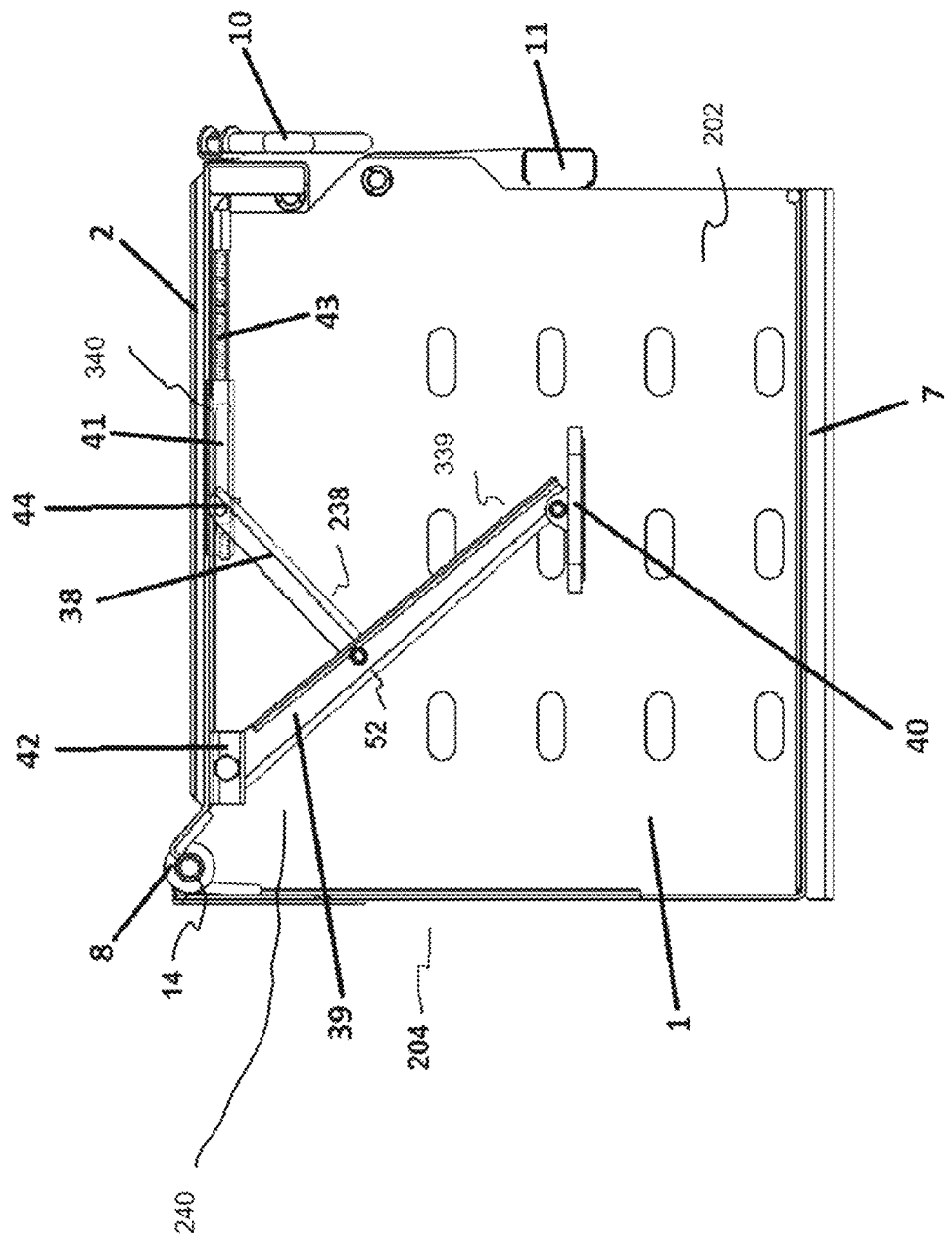
FIG # 6

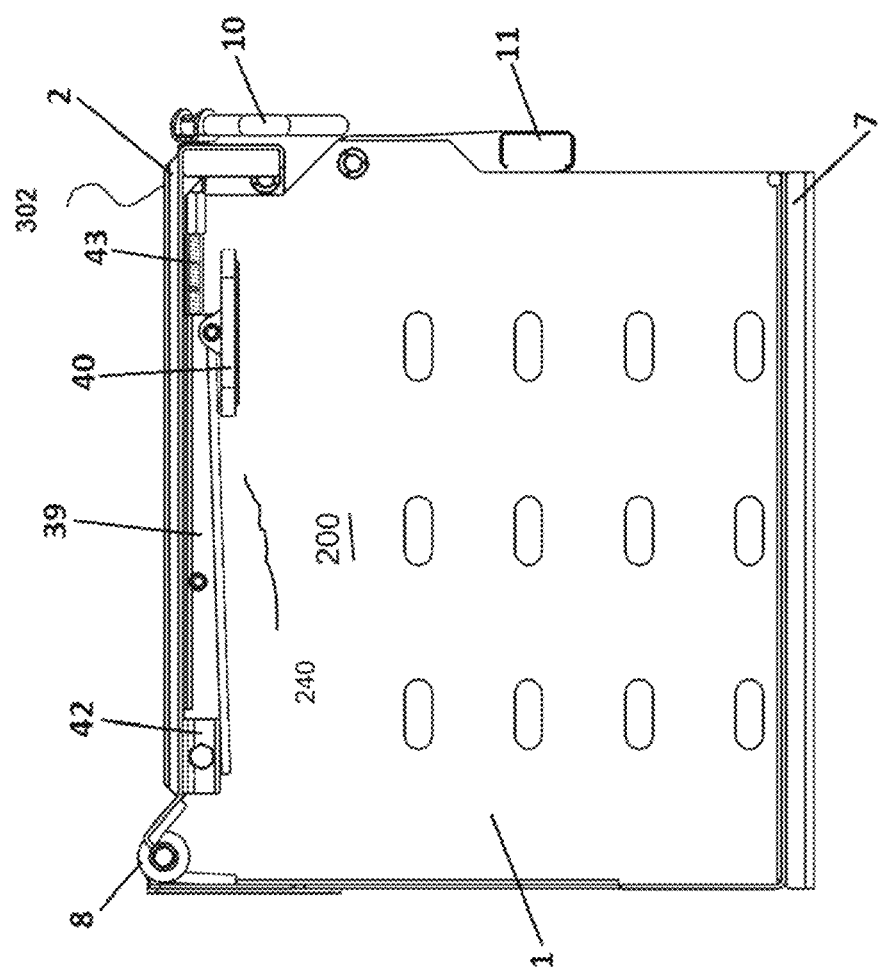

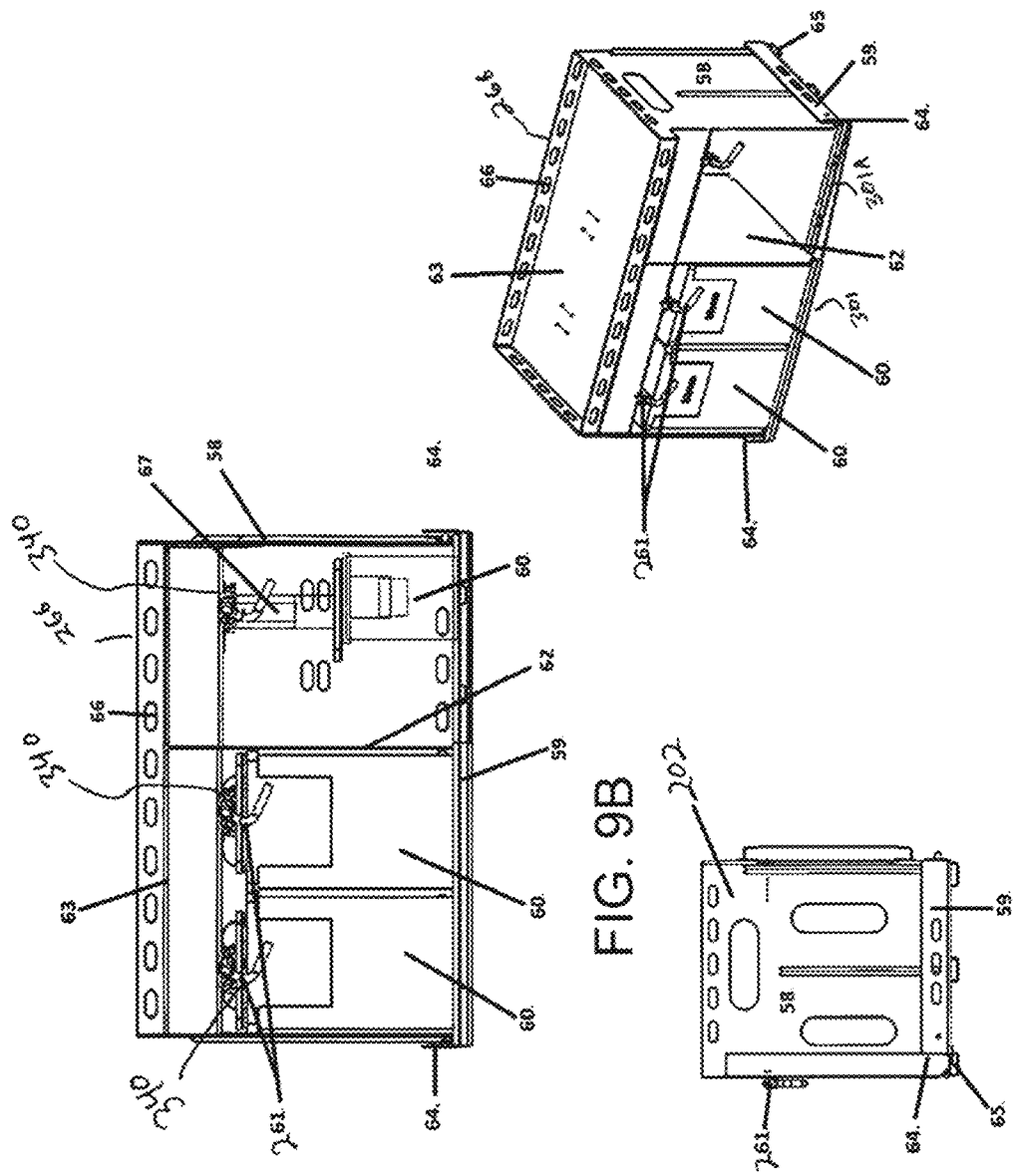

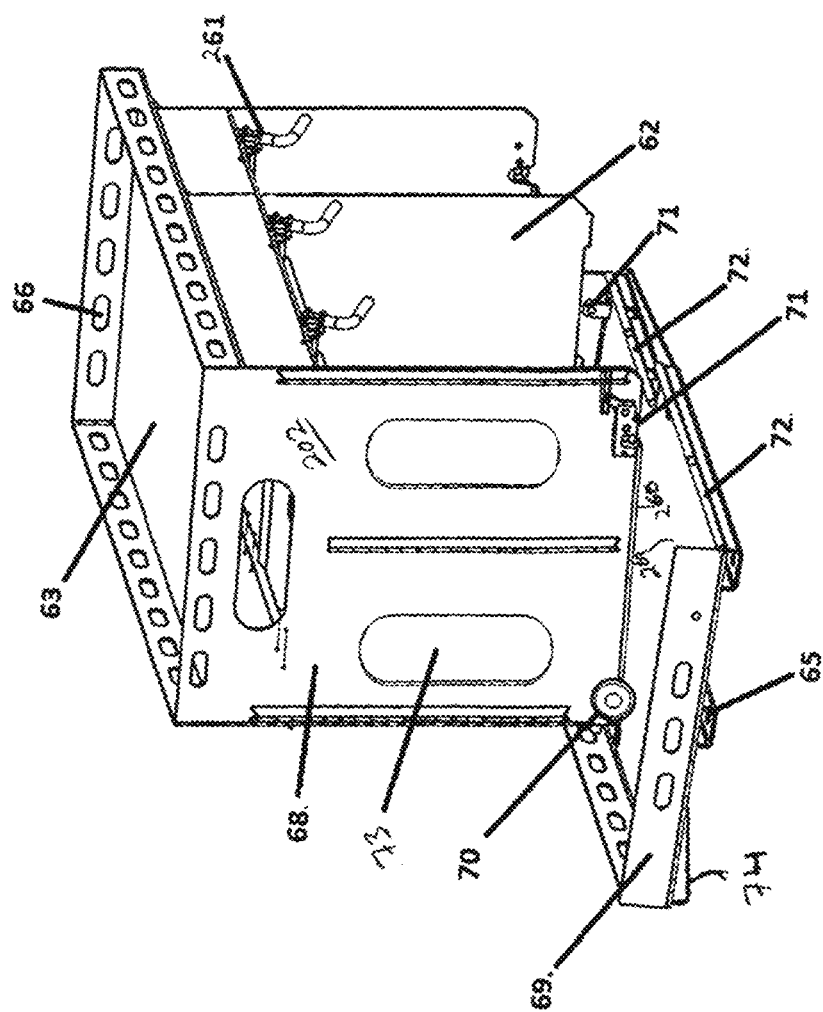
FIG #10

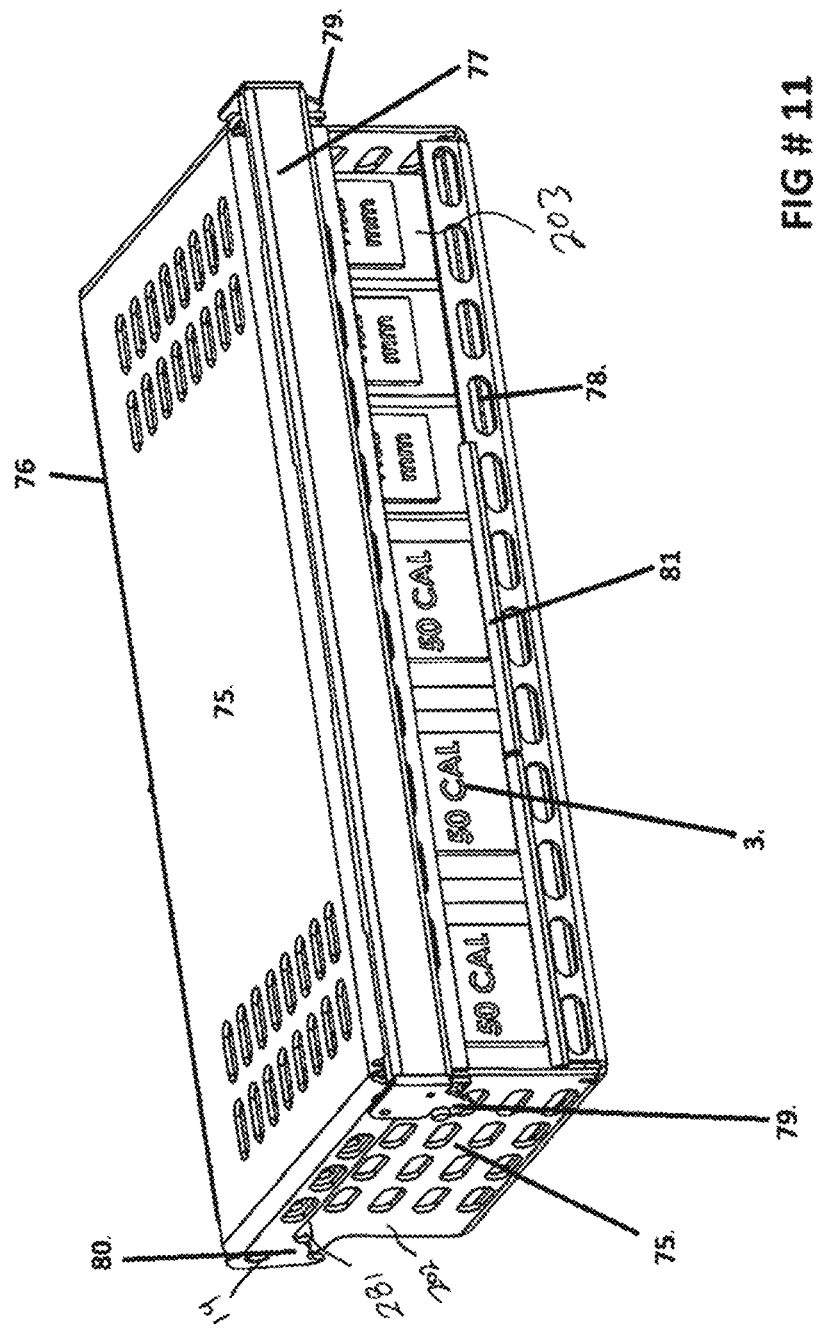
FIG # 11

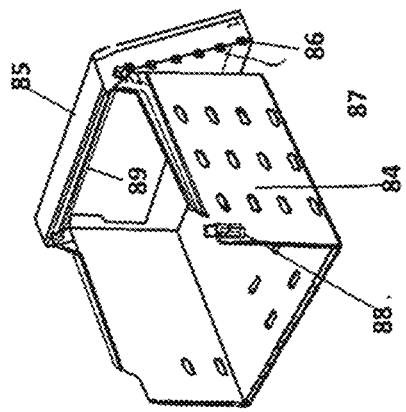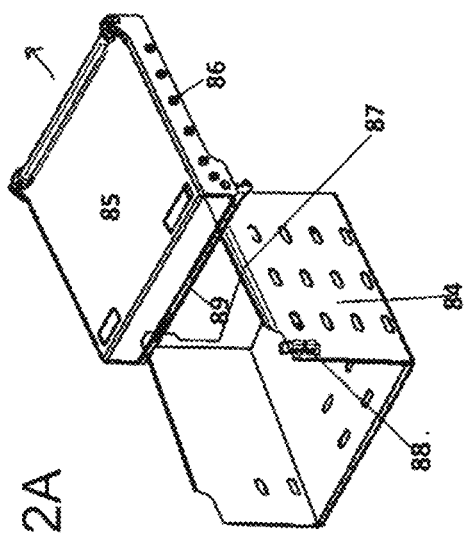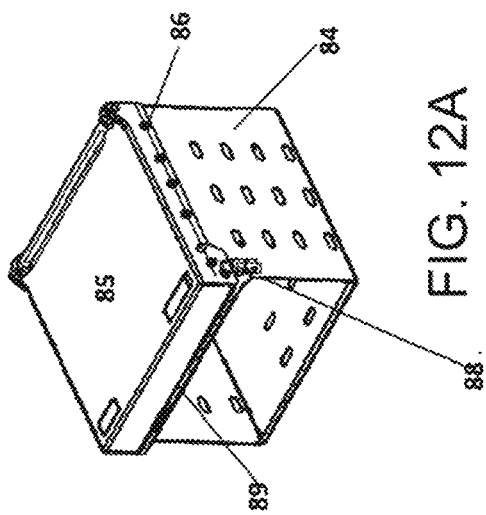

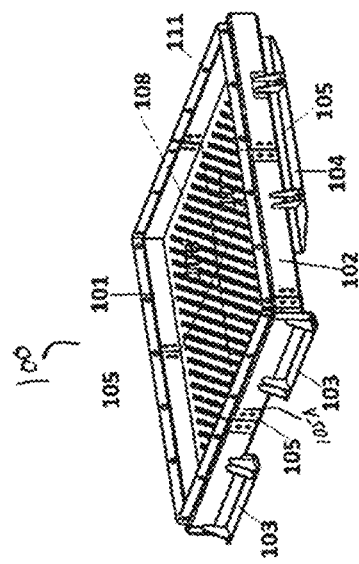
FIG. 14D
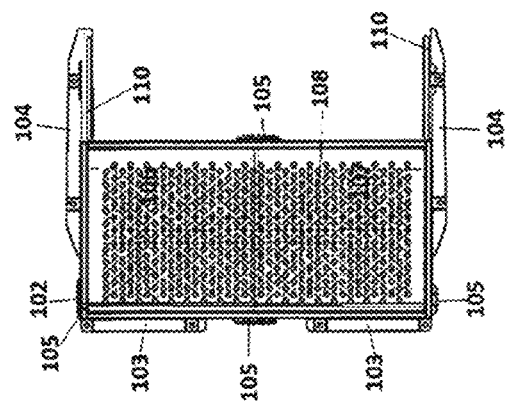
FIG. 14E
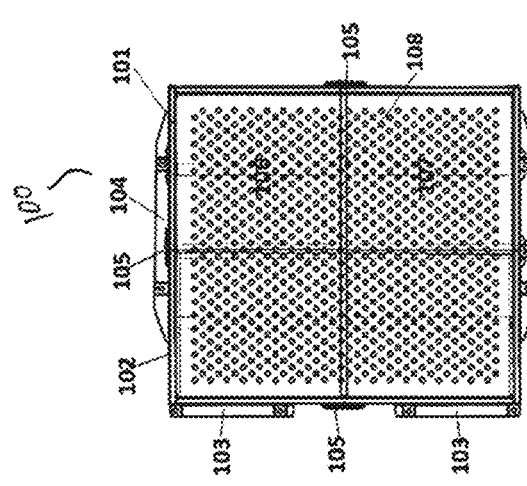
FIG. 14A
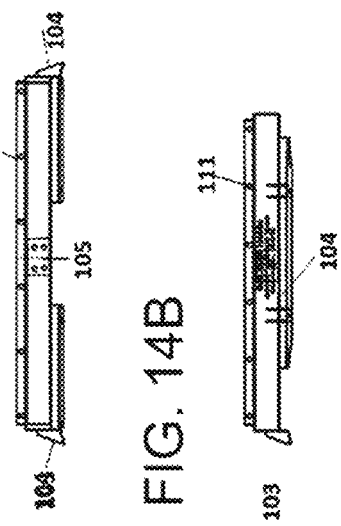
FIG. 14B
FIG. 14C

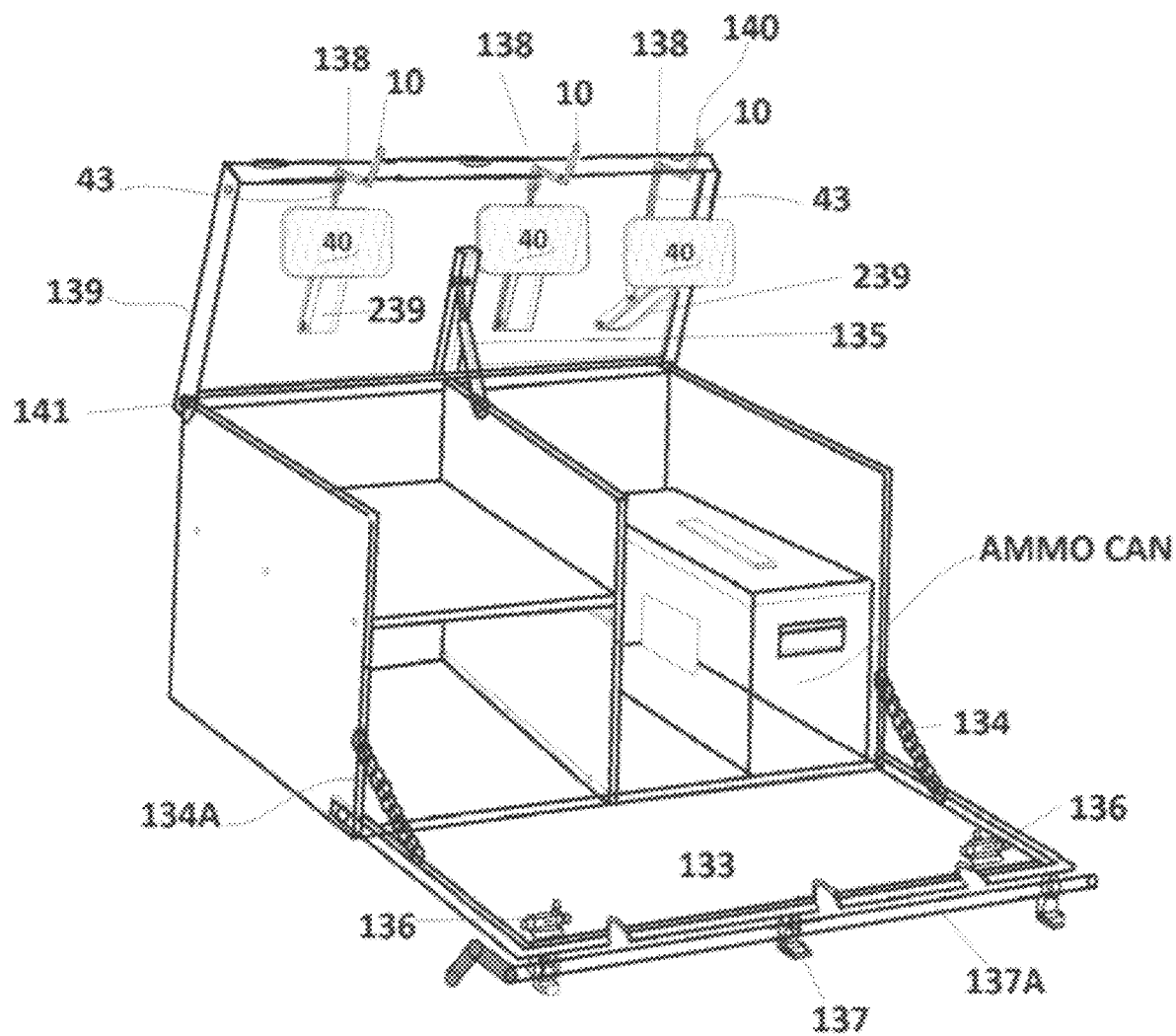
FIG # 18

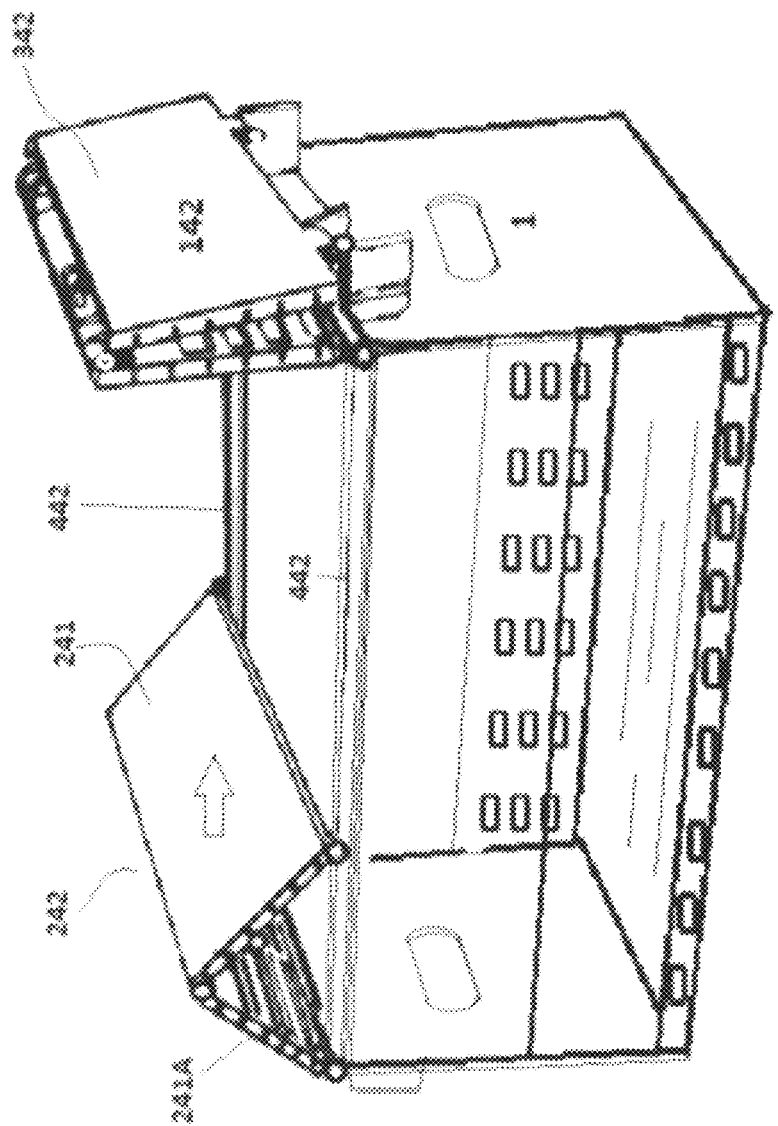

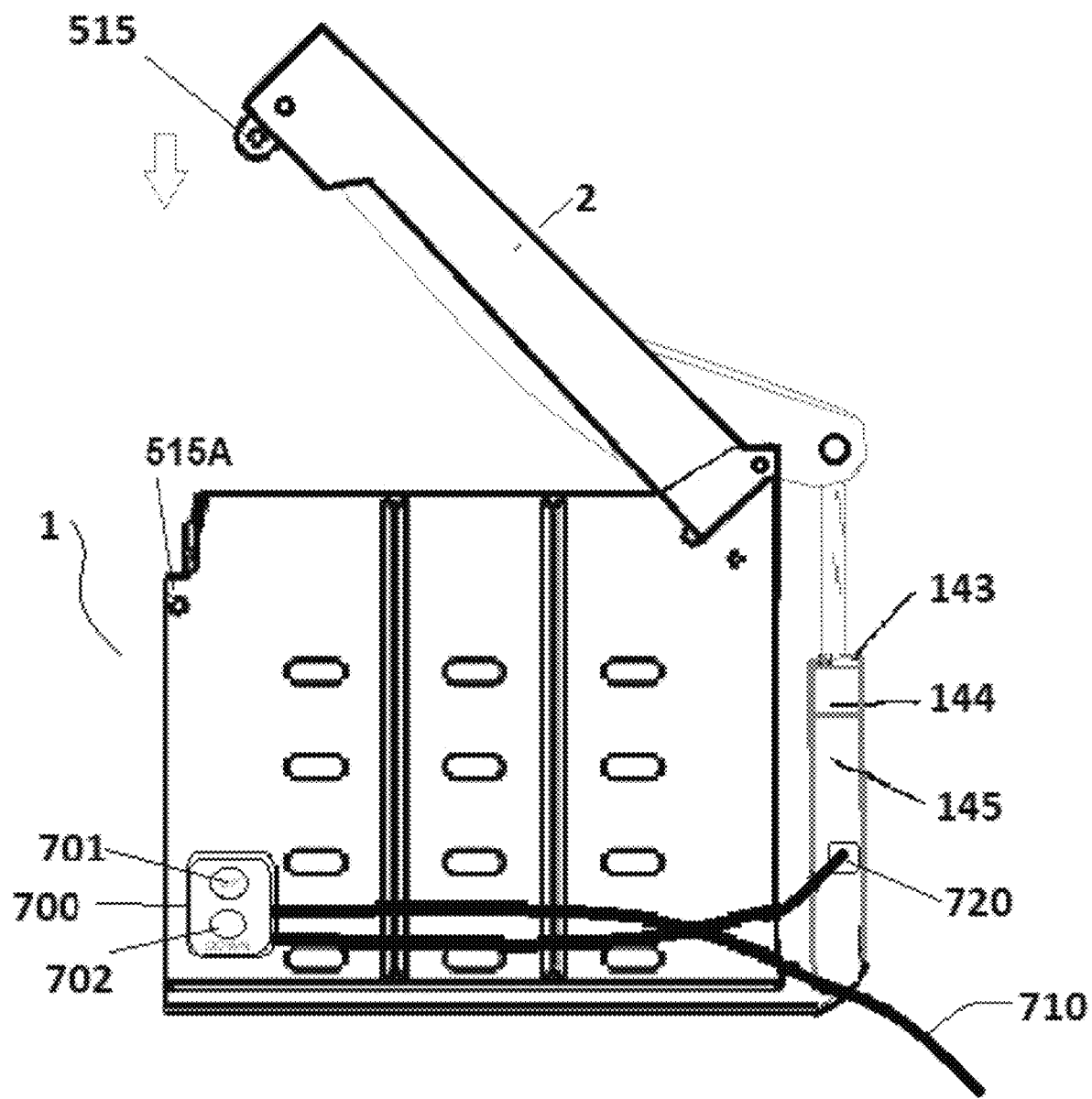
FIG. #20

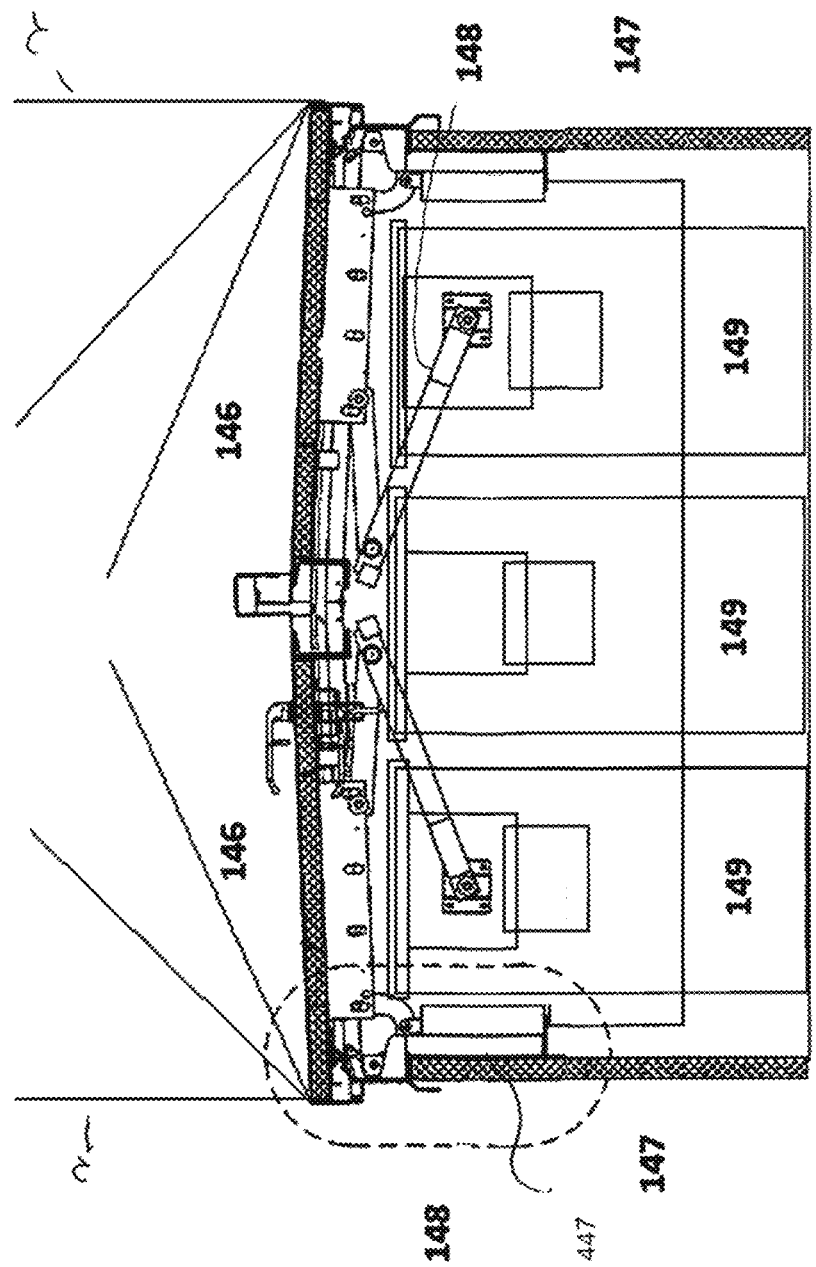

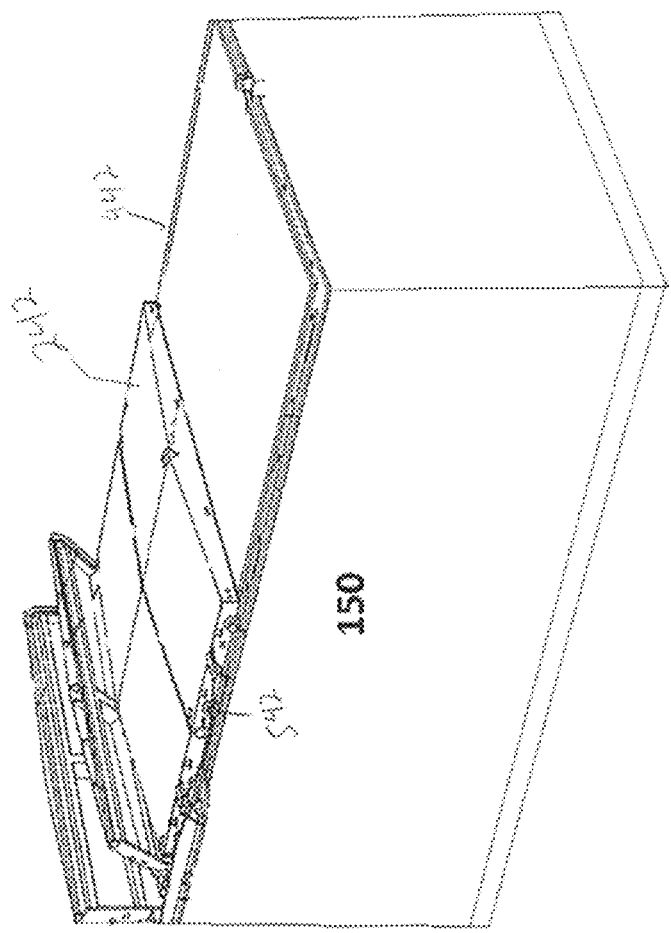

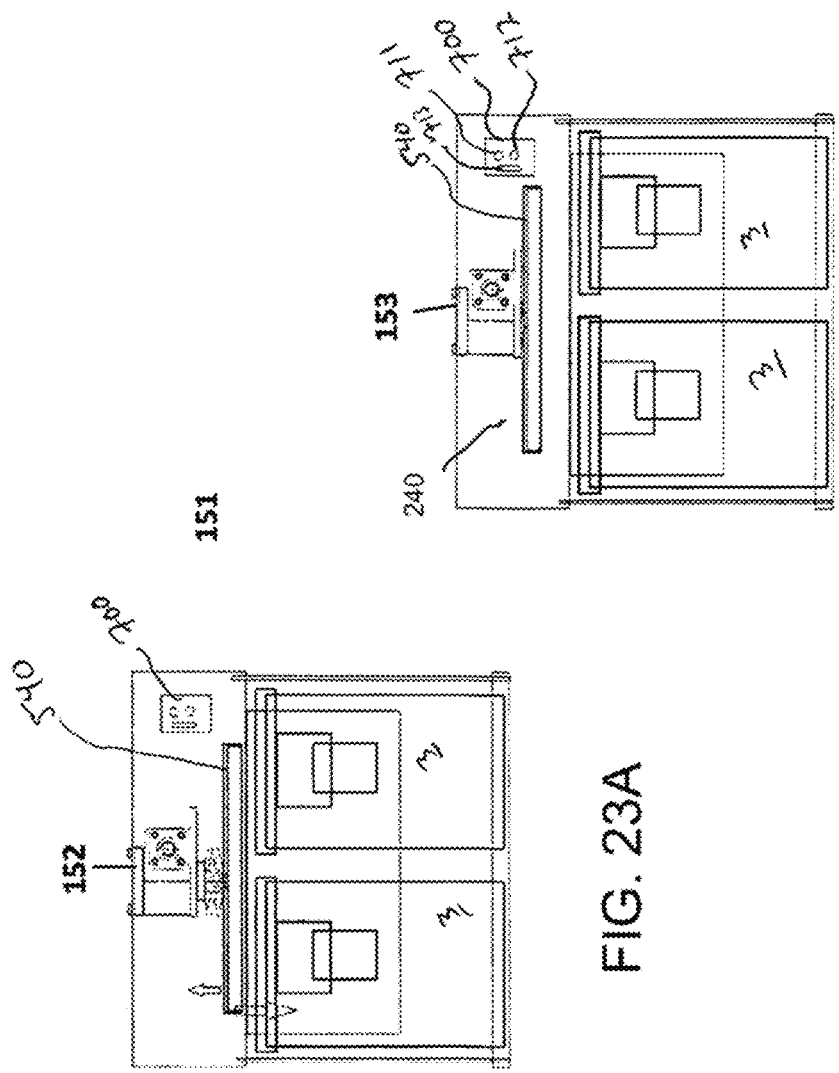

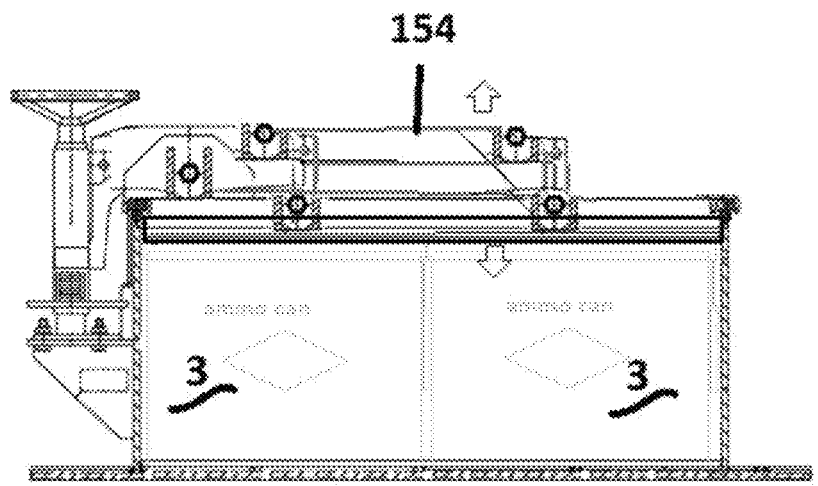
FIG # 24 A
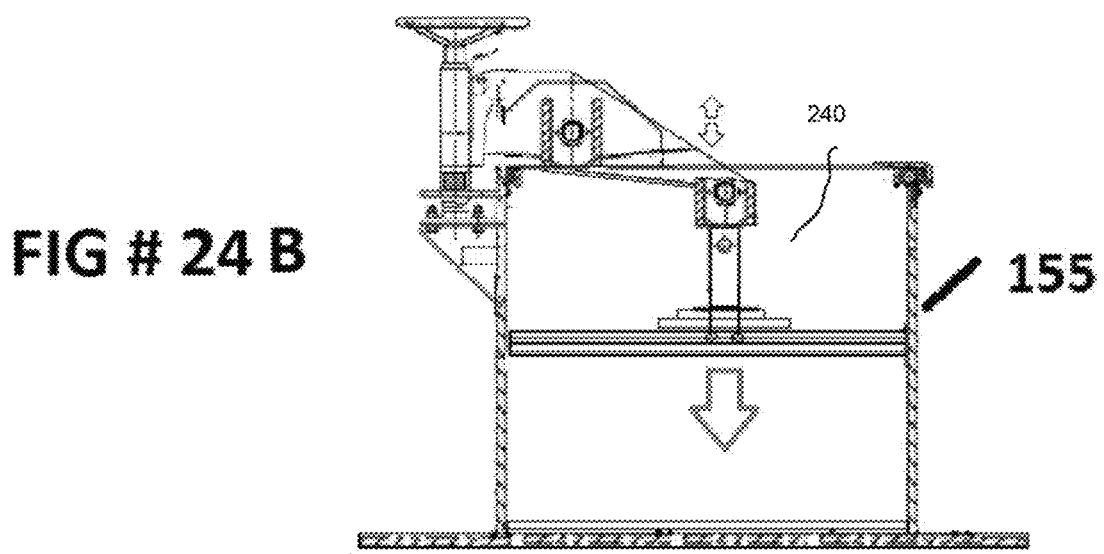
FIG # 24 B

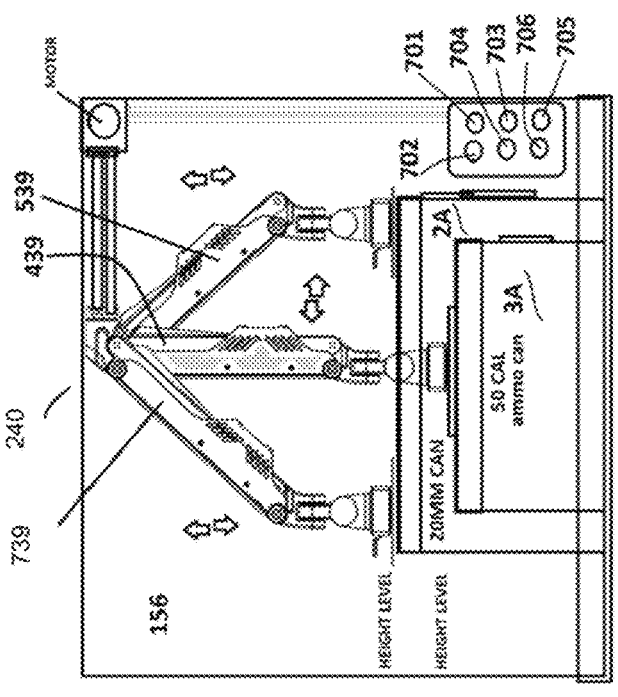
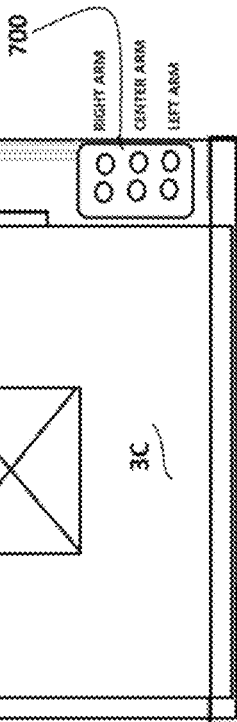
FIG. #25 A
FIG. #25 B

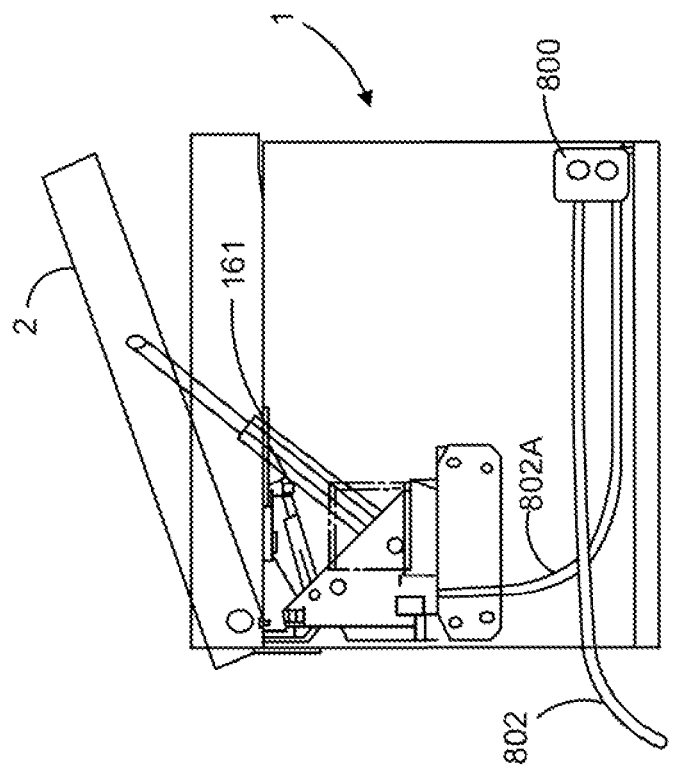
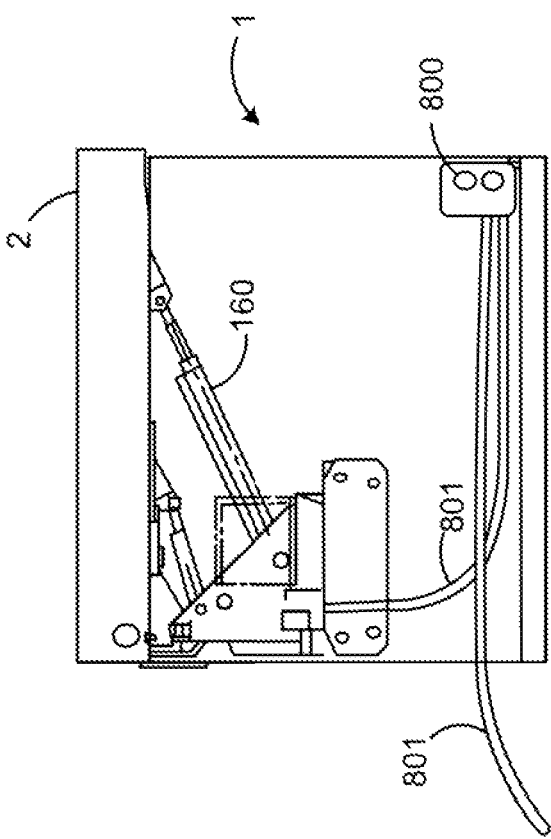

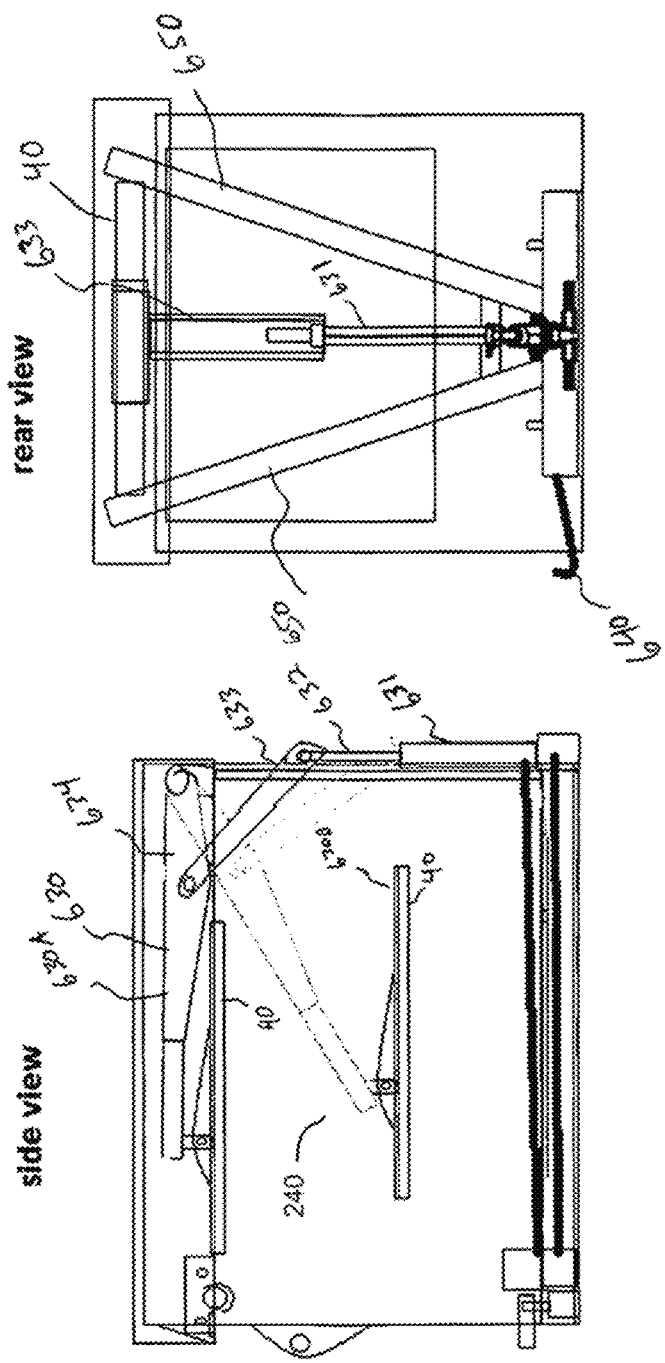

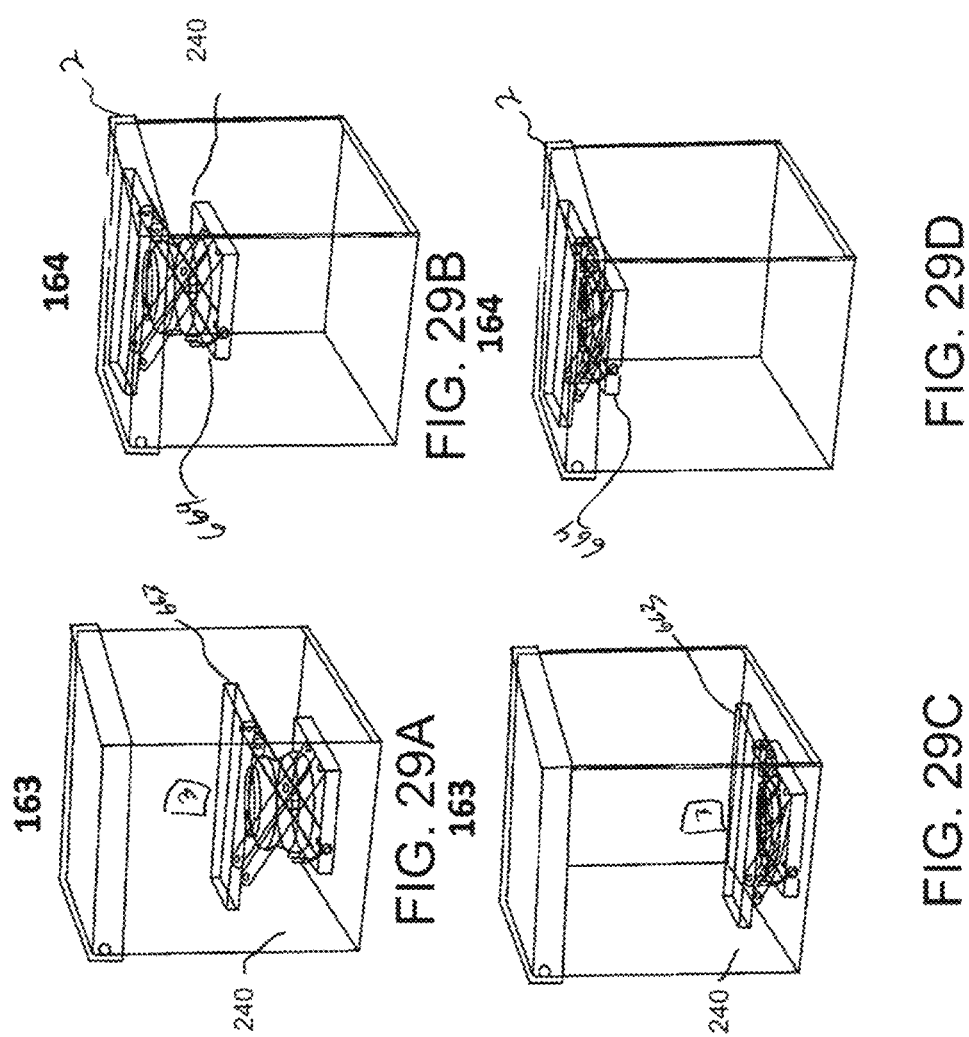

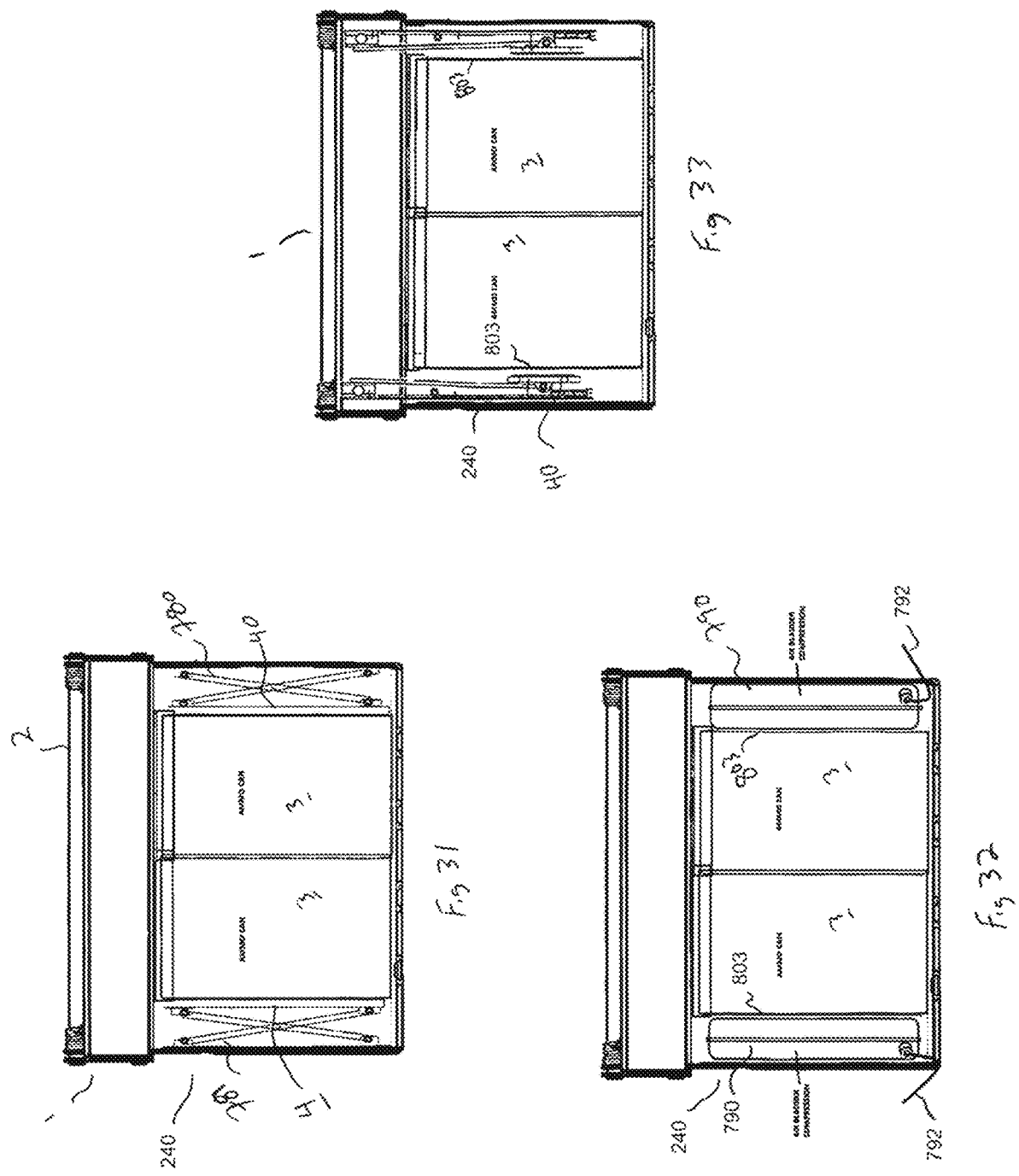

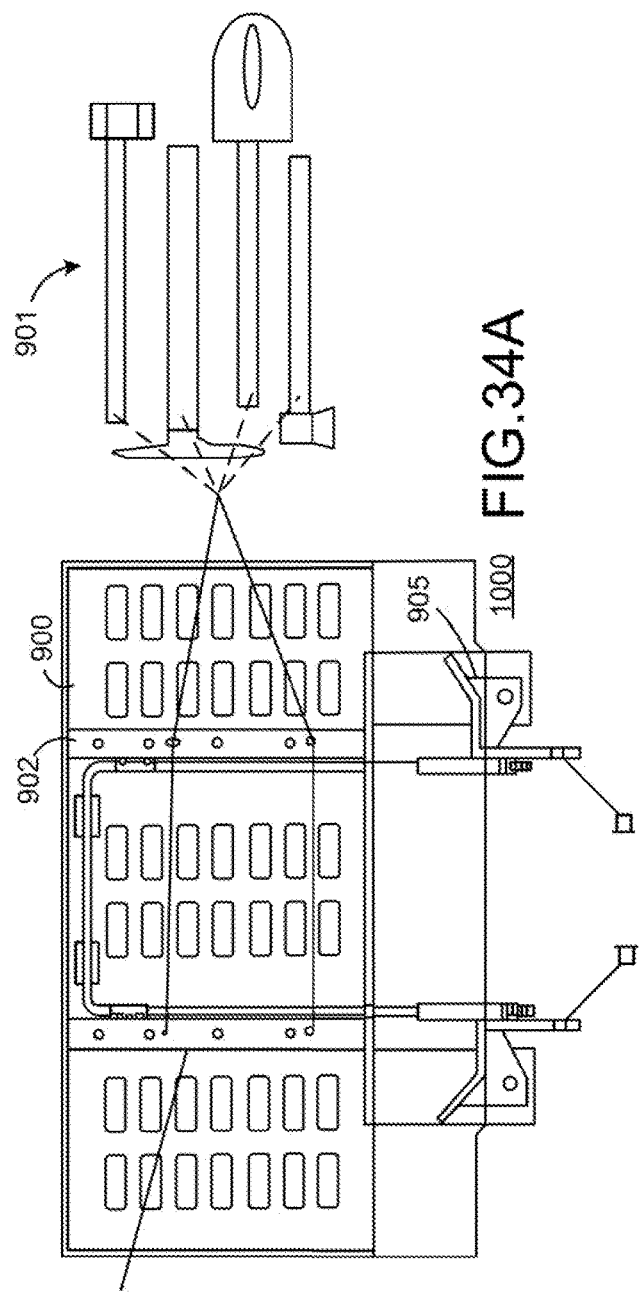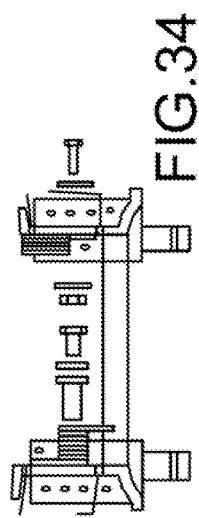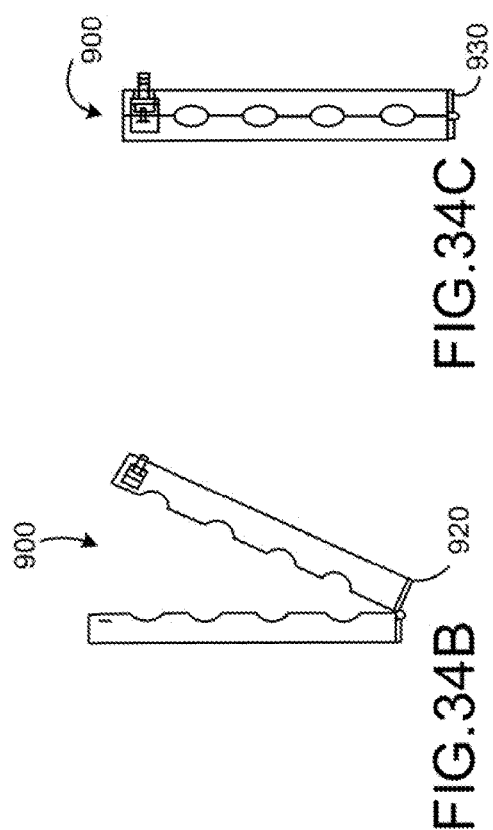
FIG.34A
FIG.34
FIG.34C
FIG.34B

RATCHETING LID AMMO CONTAINER LID

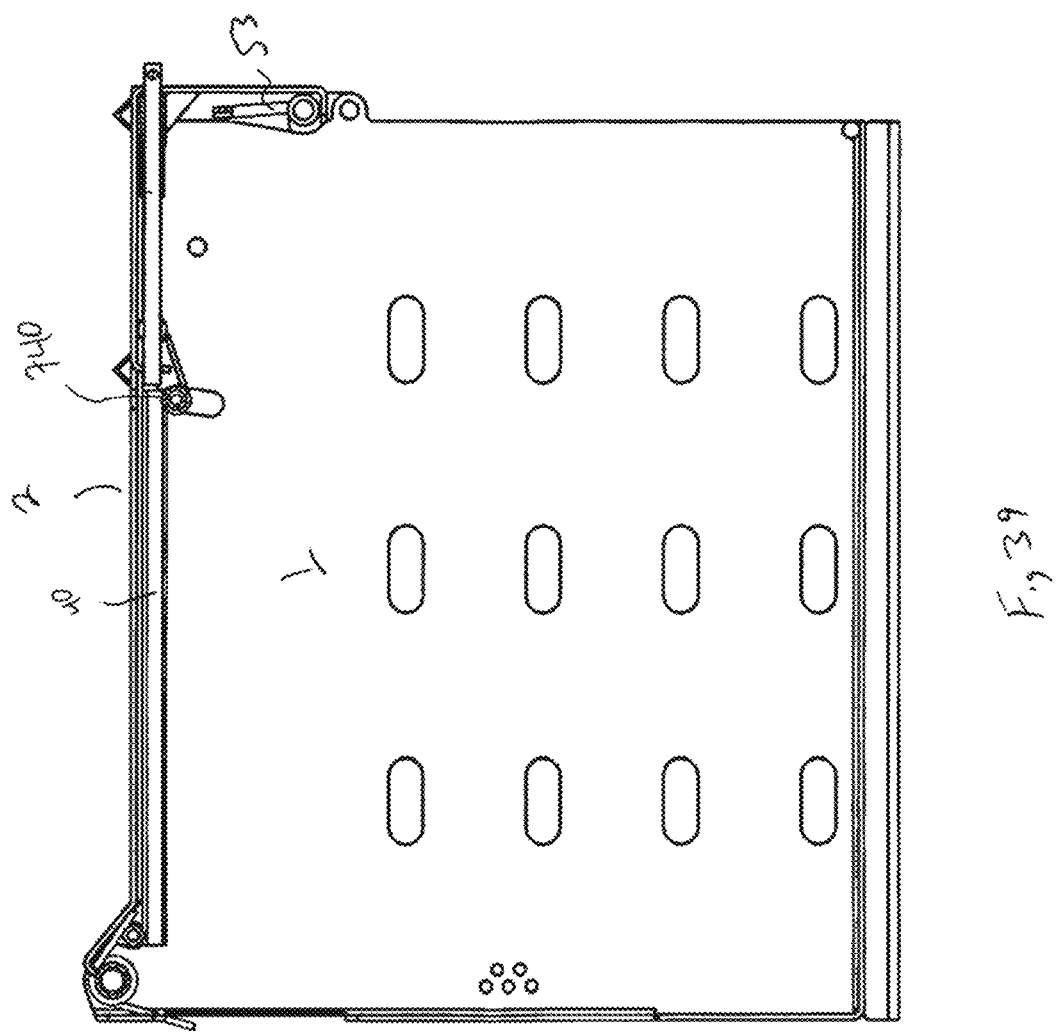

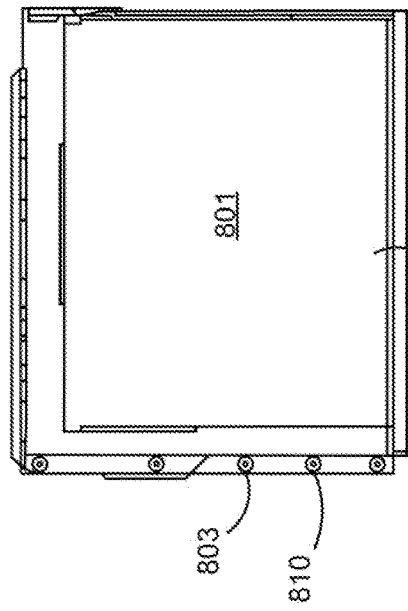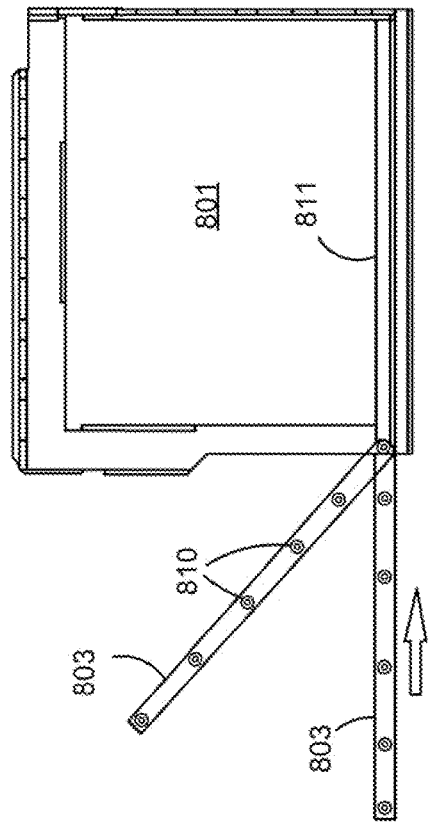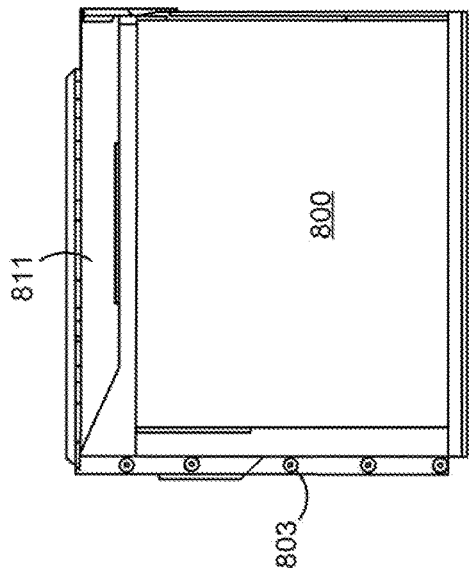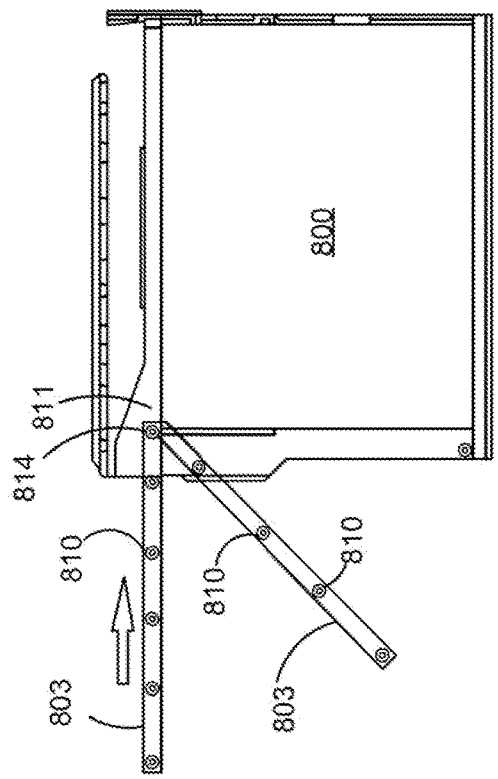

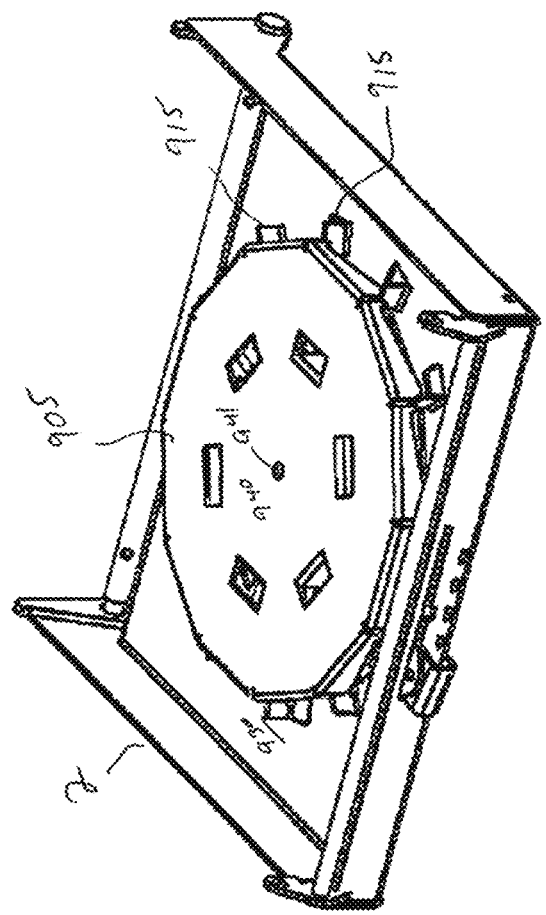
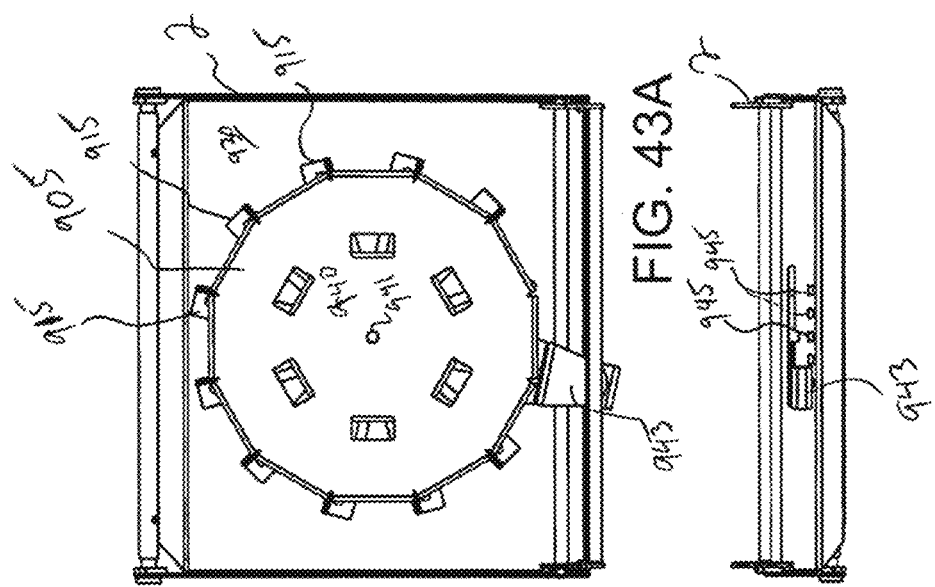
FIG. 43C
FIG. 43A
FIG. 43B

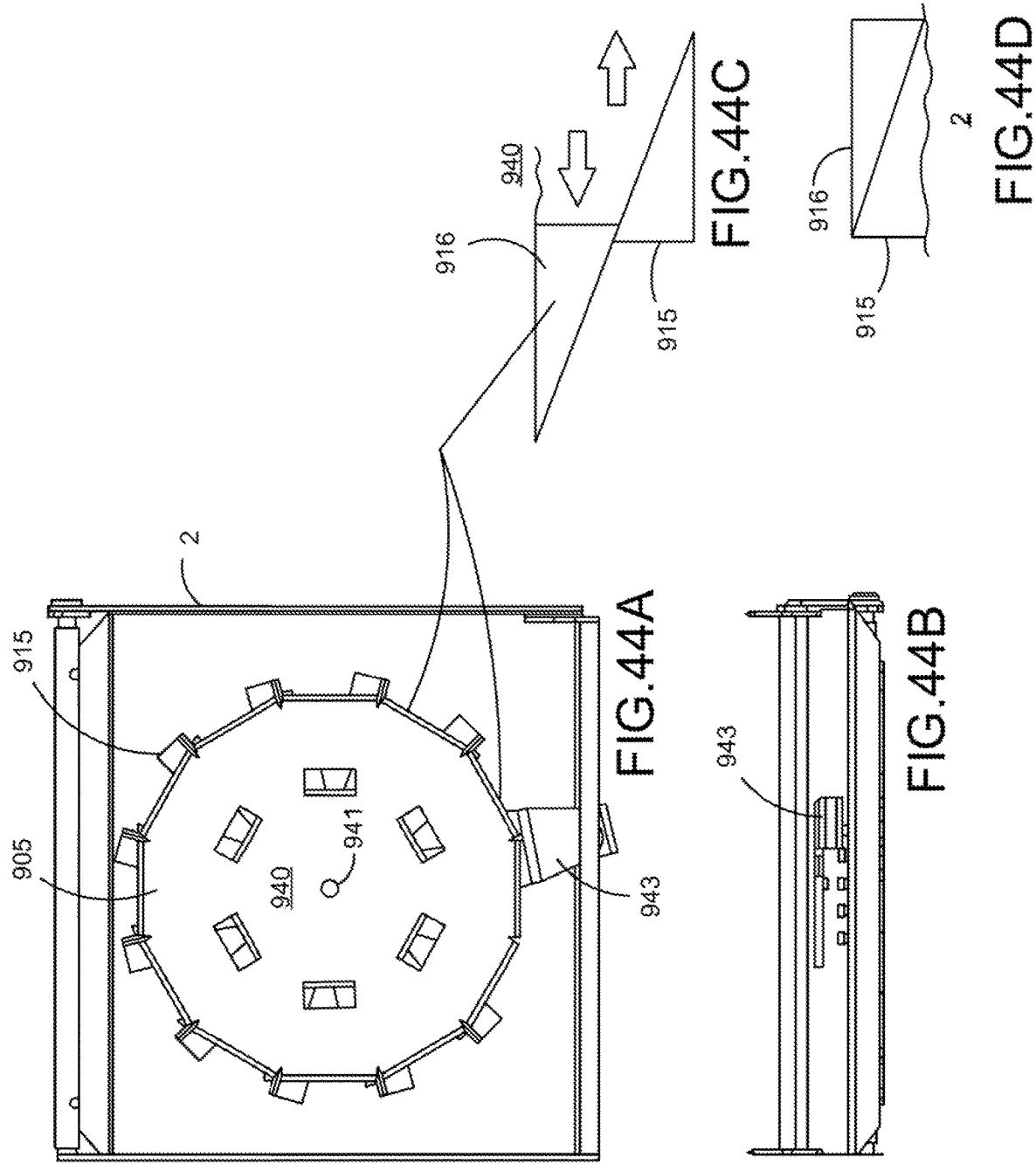

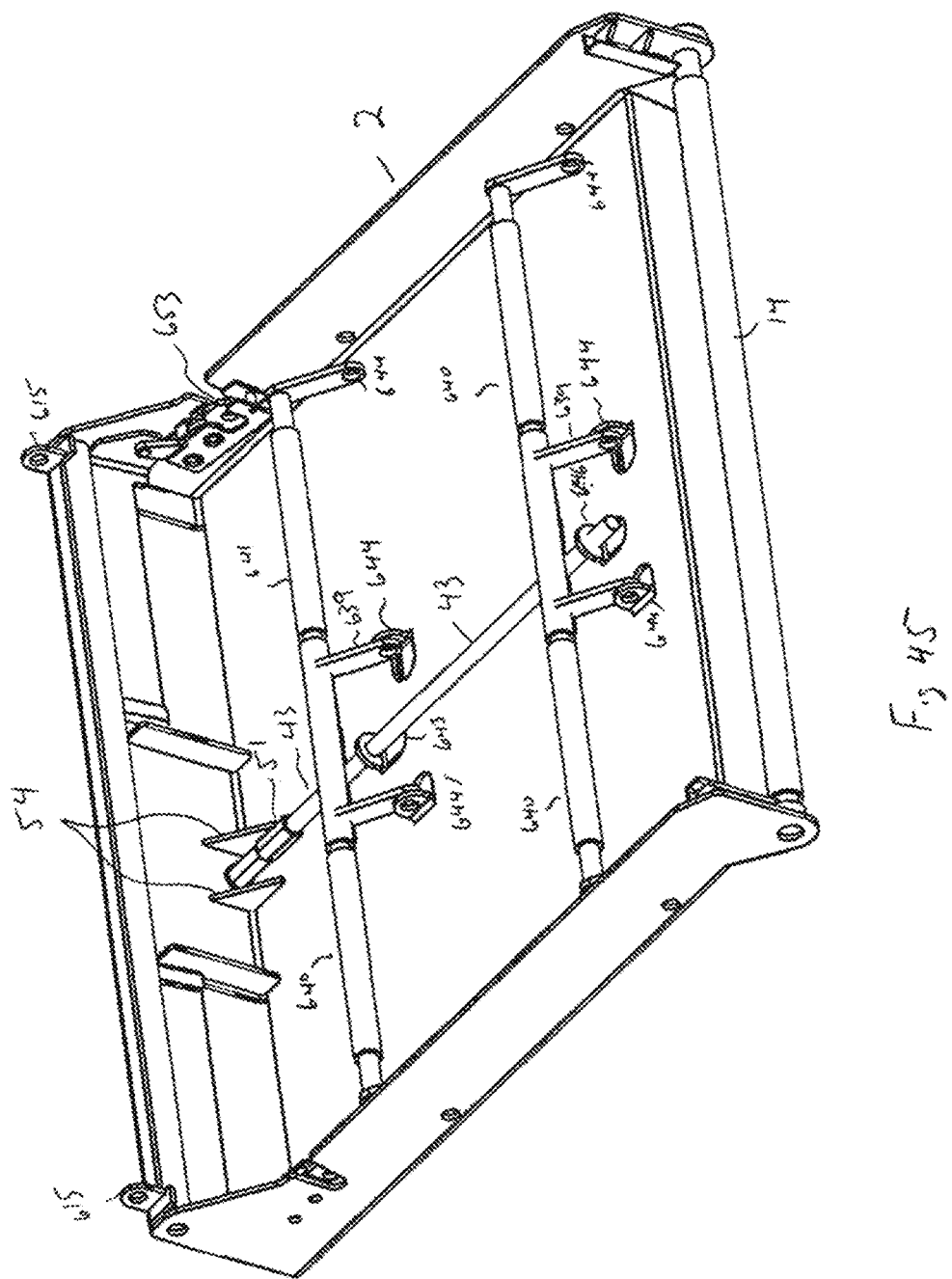

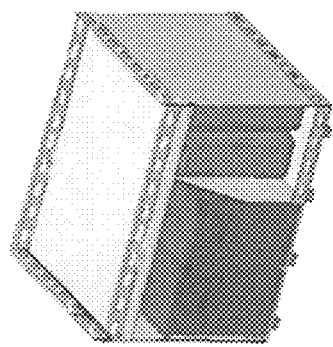
FIG. 48D
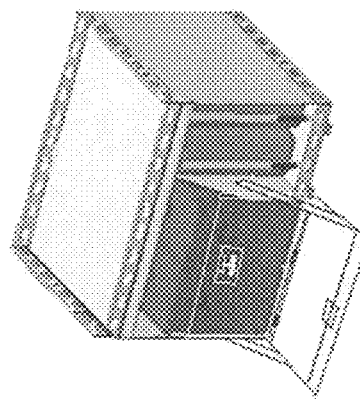
FIG. 48C
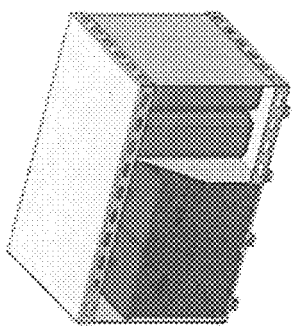
FIG. 48B
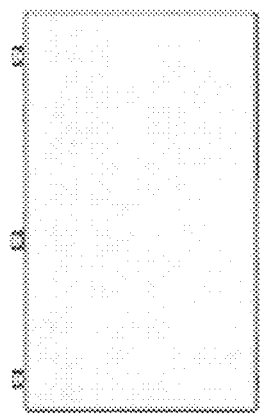
FIG. 48A
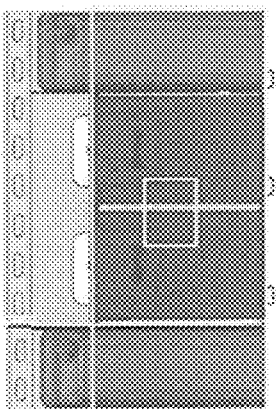
FIG. 48G
FIG. 48F
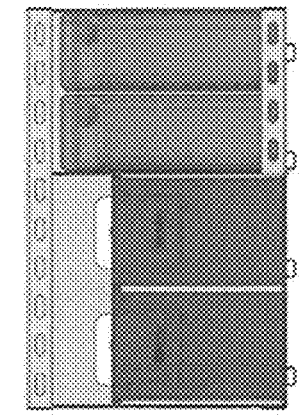
FIG. 48E

VEHICLE MOUNTED STORAGE SYSTEMS

CLAIM OF PRIORITY

The present application includes subject matter disclosed in, and claims priority to, provisional applications emitted Roof Rack Systems filed Feb. 3, and Feb. 7, 2017 and assigned Ser. Nos. 62/454,619 and 62/455,876, respectively, describing inventions made by the present inventor and incorporated herein by reference.

FIELD OF THE INVENTION

The present invention regards stowage solutions on military platforms, specifically roof racks and lockable boxes, and platforms to secure the following: ammunition, smoke, M.R.E., water bottles, assault pack, grenades, rock sacks, and other necessary needs to accommodate soldiers in theater or combat situations.

SUMMARY OF THE INVENTION

An ammunition container comprising two side walls, a partial back wall, floor, and moveable lid. Each wall and floor preferably have shaped holes for drainage of rainwater and snow. The lid of the container opens and closes for installation and removal of ammo cans or other items. The lid may be operated manually through a latch, and may be operated through an electric motor, pneumatic motor, or hydraulic motor. The lid may use a spring to open the lid, or may alternatively use a gas spring shock, a screw jack, hydraulic cylinder, pneumatic cylinder, worm drive linear cylinder, manual operation, suspension air bladder, pivot arm, over center lifting device, and/or geared handle and sprocket. The lid may include a manual override to open with an automated feature.

Interior divider walls may be used. The container may be lined with foam, padding, bed liner, rubber coating, rubber panel plastic panel. The container may be hinged at the base to tilt the box in an open and closed position. The container may have a removable floor wherein the container lifts up. The wheels of the container may be mounted on the side walls to assist in re-installation with the floor. The container may be a solid piece with non-removable lid. The container may have a roll up door as an alternative to tilting lid. The container may have a lid that rolls on wheels in a track for the lid to slide in any direction. The container may have a full back wall and a lid that slides from the top and pivots down to make a $4^{th}$ wall. The container may have a full back wall and a lid that slides from the bottom and pivots up to make a $4^{th}$ wall. The container may have hinged side walls to pivot downward allowing side access. The container may have layered side walls that extend to allow for telescoping and varying size options.

BRIEF DESCRIPTION OF DRAWINGS

FIG. 1 illustrates a perspective view of a container of the present embodiment.

FIG. 2 illustrates a perspective view of a container of the present embodiment.

FIG. 3A illustrates a quad sectional container in a partial opened top position embodiment of the present invention.

FIG. 3B illustrates a bi-sectional container in a fully opened one-hundred-eighty degree opened top position embodiment of the present invention.

FIG. 3C illustrates a uni-sectional container in a closed top position with overlook embodiment of the present invention.

FIG. 4 illustrates a six can wide container embodiment of the present invention.

FIG. 5A illustrates a top view of a framed container mount embodiment of the present invention.

FIG. 5B illustrates a side perspective view of a framed container mount embodiment of the present invention.

FIG. 5C illustrates a side view of a framed container mount embodiment of the present invention.

FIG. 5D illustrates a front view of a framed container mount embodiment of the present invention.

FIG. 6 illustrates a partial cutaway cross-sectional side view of the container of the present invention.

FIG. 7 illustrates a partial cutaway cross-sectional side view of the container of the present invention.

FIG. 8AA illustrates an underside view of a lid embodiment of the present invention.

FIG. 8BB illustrates an underside view of a lid embodiment of the present invention.

FIG. 9A illustrates a side view of a removable container system of the present invention.

FIG. 9B illustrates a front view of a removable container system of the present invention.

FIG. 9C illustrates a perspective view of a removable container system of the present invention.

FIG. 10 illustrates a partially exploded view of a removable tray and container system of the present invention.

FIG. 11 illustrates a small dismount container embodiment of the present invention in perspective view.

FIG. 12A illustrates a perspective view of a sliding lid container embodiment of the present invention in closed position.

FIG. 12B illustrates a perspective view of a sliding lid container embodiment of the present invention opened near 270°.

FIG. 12C illustrates three a perspective views of a sliding lid container embodiment of the present invention opened 180°.

FIG. 14A illustrates a top view of an open roof rack embodiment of the present invention.

FIG. 14B illustrates a side view of an open roof rack embodiment of the present invention.

FIG. 14C illustrates a side view of a closed roof rack embodiment of the present invention.

FIG. 14D illustrates a perspective view of an open roof rack embodiment of the present invention.

FIG. 14E illustrates a top view of a closed roof rack embodiment of the present invention.

FIG. 18 illustrates a perspective view of a container with hinged front wall in open position.

FIG. 19 illustrates a container with rollup folding doors in partially open perspective position.

FIG. 20 illustrates a side view of a container of the present embodiment open at 45°.

FIG. 21 illustrates a front view of a double door lid container of the present invention in partial see-through.

FIG. 22 illustrates a perspective view of a slide and fold lid container system of the present invention.

FIG. 23A illustrates a partial see-through front view of a container of the present invention in compressed positions.

FIG. 23B illustrates a partial see-through front view of a container of the present invention in uncompressed position.

FIG. 24A illustrates a front view in partial see-through of a container system embodiment of the present invention.

FIG. 24B illustrates a side view in partial see-through of a container system embodiment of the present invention.

FIG. 25A illustrates a cutaway side view of a container of the present invention with varied size cans placed therein.

FIG. 25B illustrates a cutaway side view of a container of the present invention with a large sized can placed therein.

FIG. 27A illustrates a see-through side view of a pneumatic cylinder embodiment of the present invention in open position.

FIG. 27B illustrates a see-through side view of a pneumatic cylinder embodiment of the present invention in open position.

FIG. 28A illustrates a side cut away view of a container of the present invention with optional compressed and uncompressed positions.

FIG. 28B illustrates a rear cut away view of a container of the present invention with optional uncompressed position.

FIG. 29A illustrates a see-through perspective view of an embodiment of a lower mounted air bladder lift compression system in compressed form in a container.

FIG. 29B illustrates a see-through perspective view of an embodiment of an upper mounted air bladder lift compression system in compressed form in a container.

FIG. 29C illustrates a see-through perspective view of an embodiment of a lower mounted air bladder lift compression system in uncompressed form in a container.

FIG. 29D illustrates a see-through perspective view of an embodiment of an upper mounted air bladder lift compression system in uncompressed form in a container.

FIG. 31 illustrates a front cutaway view of a screw scissor side compression system container of the present invention.

FIG. 32 illustrates a partial cutaway front view of a side impact air bladder compression system container of the present invention.

FIG. 33 illustrates a partial cutaway front view of a jack side compression container system of the present invention.

FIG. 34A illustrates an exploded front view of an alternative container fold down holder embodiment of the present invention.

FIG. 34B illustrates a slightly ajar right side view of an alternative container fold down holder embodiment of the present invention.

FIG. 34C illustrates a closed right side view of an alternative container fold down holder embodiment of the present invention.

FIG. 34D illustrates an exploded side view of the lower portion of FIG. 34A.

FIG. 39 illustrates a side view of a container embodiment of the present invention.

FIG. 40 illustrates a top mount sliding door container system of the present invention in closed alternative open and partial open positions.

FIG. 40A illustrates a top mount sliding door container system of the present invention in closed position.

FIG. 41 illustrates a side view of a sliding door container system of the present invention with bottom sliding door in alternative open and partial open positions.

FIG. 41A illustrates a side view of a sliding door container system of the present invention with bottom sliding door in closed position.

FIG. 43A illustrates an underside view of a lid of a lid of a container of an embodiment of the present invention.

FIG. 43B illustrates a front side view of a lid of a container of an embodiment of the present invention.

FIG. 43C illustrates a perspective underside view of a lid of a container of an embodiment of the present invention.

FIG. 44A illustrates an underside view of a lid of the present invention.

FIG. 44B illustrates a front side view of a lid of the present invention.

FIGS. 44C and 44D illustrate a magnified side view of alternative positions of the compression device of the lid shown in FIG. 44A.

FIG. 45 illustrates an underside view of the lid of an embodiment of the present invention.

FIG. 47 illustrates a perspective view of the removable container system of an embodiment of a tray and container system of the present invention.

FIG. 48A illustrates a top view of an embodiment of the present invention.

FIG. 48B illustrates a perspective view of a container embodiment of the present invention.

FIG. 48C illustrates a perspective view of a container with open door embodiment of the present invention.

FIG. 48D illustrates a perspective view of a container with crown embodiment of the present invention.

FIG. 48E illustrates a front view of a loaded container embodiment of the present invention.

FIG. 48F illustrates a partial cutaway side view of a container embodiment of the present invention.

FIG. 48G illustrates a from view of a container embodiment of the present invention.

DETAILED DESCRIPTION

Figure 8A:
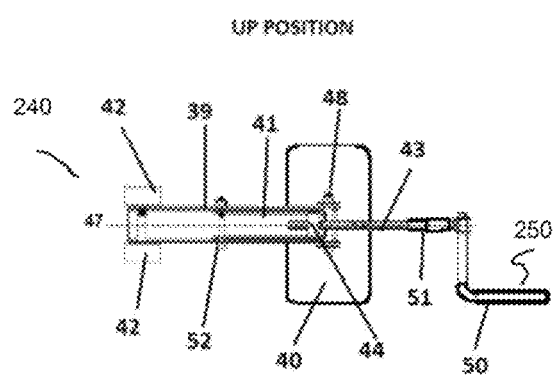
FIG. 8A illustrates a top view of the crank and bar pressure systems of the present invention at unengaged status.

The roof racks and ammo boxes have multiple configurations to speed up loading or unloading. Existing ammo trays use traditional straps to secure gear and ammo within the tray. It takes 5+ minutes to exit vehicle, undo the straps, retrieve munition to sustain combat vehicle situations, re-secure the straps, and return to the safety of vehicle. The present invention has average time of 15 seconds to exit vehicle, retrieve munitions, and re-enter vehicle to engage the combat situation speeding time of recovery and keeping the soldier out of harm's way for a shorter period of time, saving both time and lives.

Ammunition Boxes

Ammo box (or container, or storage container) refers to the larger container to hold ammunition cans, and generally includes six mam sides, as is known in the art of military equipment. Ammo box lengths can range from 5 inches to 6 feet and have a width of 8 inches to over 4 feet, intended to store on or up to many more ammo cans. Ammo boxes can be produced to be capable of withstanding G forces that are applied in off road rough terrain combat situations from 5 lbs to 2,000 lbs+, to prevent jostling of ammo cans or other equipment stored therein. The structure of the ammo storage containers can be square, rectangular, octagon, or the like with a flat bottom. The ammo box may include a bottom tray, optionally with vertical walls, that can be stationary, fixed, hinged to fold down, or open outward away from box shape configuration making access easier and faster to retrieve needed ammo or other supplies. Often times, they will have a planar bottom, or at least a portion of the bottom will be planar or otherwise contoured to mount on a vehicle. The ammo container can be made to have an adjustable size through telescoping walls of the bottom and top and/or sides to adjust to different ammo load configurations, expanding the size from small payload to large payload of ammo cans. The ammo container may have hinged lids to contain various sized cans, Jerry cans, water containers, or the like. The lid may be fixed in a closed, secure position or open in an angle up to 270° in movement.

The lid of an ammunition box can open in a variety of fashions, and may be located on the top, or sides, front, back or bottom as needed. The lid can also move in a horizontal sliding motion in any direction: to the right, to the left, to the font, or to the back, which operates on a rail, in a channel, on a hearing surface or the like. The lid can fold down to the side in a vertical position, after sliding to its furthest point on the top or bottom of the ammo container, pivoted on a hinge point. The lid may use side to side folding down along the side of the box container rear side, right, left, front side of the ammo containers on drawer slides channel-bearing roller slides allowing a movement in, out, side to side sliding action allowing the lid to be moved to its furthest point with option to allow lid to rotate from a horizontal position down to a vertical position. The lid can pivot on a pin, tubing, shaft, axle, or hinge or the like, allowing the lid to rotate in a 0° to 270° angle for range of motion when opening or closing the lid. In some instances where clearance on top of a top-opening box is limited, such as to a few inches, the lid may be openable to a slight extent necessary to provide clearance for a can to be removed, such as through an open front end. The container can have springs on an axle hinge to assist in lifting the lid and/or utilize a hydraulic cylinder, electric linear screw driven actuator, air lift actuator, or an air spring strut or anything that can assist in lifting or closing the lid. The lid can be secured to the ammo box container with multiple latch systems such as: single stage, double-stage, door latches, spring hook, cam latch, over center latch, spring pin latch, rotating latch, cam over latch, push button latch, sliding latch, snap down latch, roll up door latch, or the like that will secure the lid to the base walls of the ammo container. The ammo container can be made of sheet metal, aluminum, carbon fiber, plastics, or any material robust enough to maintain strength under heavy load, vibration, or G force that can be applied to the box structure.

The floor and ceiling or side walls of the ammo box can be layered in such a way to provide expandability of the dimensions of the ammo container in width, length and/or height. When the two halves are stacked upon one another, the ammo container is in its smallest size/position. Pulling the two sides apart creates a telescoping action wherein the layered walls are pulled apart and rest parallel to each other. The two sides will lock in place creating the largest size with a slight overlap between to the two halves to secure them together. There can be several sizes between the smallest and largest size where the sides can be locked in place, allowing for greater flexibility.

Conveyor System in Ammo Box

The ammo container can be built to accommodate a conveyor system, wherein once engaged, one ammo box advances at a time with assistance of an accessible panel (or channel) built into the box that may allow a conveyor belt to facilitates alignment and movement of the can through the ammo container channel. The conveyor may reach an access through the exterior of the vehicle and provide supply of cans into the interior of the vehicle, preferably on a conveyor system. The conveyor system wilt preferably provide for the can to be moved into the interior of the vehicle to access by a passenger, the ammo can being manipulated, or rotated, for ease of use and access. The conveyor may terminate inside the vehicle, thus eliminating the need for a soldier to exit the vehicle to retrieve the ammo stored on the outside. The conveyor can be made of rubber, chain, cables, pulleys, or any material robust enough to support the weight and facilitate movement of loaded or unloaded ammo cans through the ammo container one can at a time. The start button to move the conveyor will be programmed so that one ammo can moves at a time. It can be wired or wireless and can be operated by a switch, remote, cell phone, or button on the container. The conveyor can be operated through an electric motor, hand crank, air motor, hydraulic, or the like. The container can also accommodate a compression system wherein each ammo can is compressed down from the top, up from the bottom, or squeezed from the sides. Engaging movement of the conveyor belt will also disengage the compression system allowing movement of the ammo can, before recompressing the remaining ammo cans inside the container at the end of the movement cycle.

Compression Systems

Within the ammo container, one or more of a multitude of compression systems can be used. Compression here is a term used to describe securing devices that mate with a side wall of the storage item (e.g. can) and place a certain amount of pressure against the stowed item to prevent the item from moving. The compression arm does not necessarily require literal compression of the Item to function as required to physically secure the location of the item relative the box. The compression system include built-in securing devices that may be mounted on the lid/roof side wall, and/or bottom of the box.

Compression mechanism can include a rotating wheel cammed compression plate, dial, or disk slides upon an inclined surface when the handle is rotated, forcing the two inclined surface parts to slide upon each other, forcing the plates away from one another, expanding its depth. For example, when the two plates are together and the cams are at their lowest point, the surface can be 1 inch in depth. When rotated to the highest level, the depth will increase to 2 inches. This applies pressure against an ammo can that keeps it in a stationary position within the container.

The compression systems may span the full width or length of the container to split the container in sections. The compression systems may compress down from the top, up from the bottom, or provide squeezed from the sides to accommodate different sizes of ammo can within the same container: 762, 50 cal, smoke grenades, flares, Mark 19, 556 Linked, Fat 50, 30 mm, 40 mm, 30 cal or the like. The compression device can utilize a scissor jack similar to a standard car jack or pivoting arms cammed to apply pressure from the bottom, top, or sides of the container that is operated manually through hand force of the operator. The compression device may be mounted on the lid, or on the floor or side walls of the ammo box. The compression device can also be operated with an electric, pneumatic, or hydraulic motor connected to a screw (preferably acme), threaded screw, or the like, hydraulic cylinder, pneumatic cylinder, air suspension bladder (leave spring or coil springs rotating mechanical cam that can be pivoted to lift a staged L-shaped arm. When pivoted, the arm will be pushed up or down, pivoting off the axis of the 90° L-shaped arm in a seesaw movement. When rotated, the pivot arm and/or pivoting plate will come into contact, compress, and hold ammo cans in a stationary position until released.

The compression device can utilize a condensed foam, rubber foam, rubber mats, waffle robber mat, honeycomb shaped medium, or any material robust enough to be compressed without causing damage to an ammo can that can be molded, glued, or adhered to the lid, floor, or sides of the container that apply pressure to an ammo can that can keep it stationary when in a closed position. The compression device can utilize a spring assisted jack, a bumper style jack, a camming device, a ratcheting gear press, or any object that applies mechanical advantage to apply compression that is lockable and releasable.

The ammo container can accommodate various heights of ammo can from 4 inches to 48 inches by utilizing a rubber, neoprene, plastic, metal, foam, or the like material to make contact with ammo cans to prevent damage while being compressed into a contained position. The ammo container will rest upon a base with or without rails to attach to vehicle with bolts, screws, be welded, use aviation track and attachment bolts or the like to secure box container to platform attachment point.

Alternatively, or in conjunction with a single direction compression system, an over centering tie-down device that utilizes a bungee or stretchable webbing material can be used to secure ammo cans within the container. The tie-down device has a hook attached to the device and another sewn on opposing end of the webbing. The hook end of the webbing can also use an adjustable linkage so that the ammo container can be formed with grooves or cavities to make the rear book end of the webbing adjustable in height. The webbing and over-center device will be pulled over the various sizes of ammo cans and secured to the front of the ammo container either ratcheted or over centered to secure the load in place until released.

Operating and Accessing Containers

The lid of the ammo container can open and close through operation of: a worm drive, direct drive, geared electric motor, hydraulic, pneumatic, transmission or non-transmission hinge, gear operated, lever arms, an everyday common hinge or the like, track with wheels or bearings connected to the lid and ammo container, or anything that will add mechanical advantage to sliding the lid in any direction or lifting up to a tilted position. It will be operated by a water proof switch or the like.

The front of ammo container can have a raised lip, a flat surface, or a bearing roller that partially or completely spans the width of the container to aid in loading and unloading ammo cans ranging from 5 lbs to 150 lbs. The rolling surface will prevent wear on the ammo container and ammo cans by reducing friction during the loading and unloading process which lengthens the longevity of each product.

The walls of the ammo container can also include panels that act as a secondary wall panel that move through mechanically over centered cams, cross bar hinge, screw, air bladder, or hydraulic or pneumatic devices that apply pressure to move panel from front, rear or sides inward to secure ammo can within the container.

In the bottom or top of the ammo container lies a spacer, which can be extruded or formed from a plate with one end formed to support a hinge pin and the opposing side is an open hook shape. The hinge pin moves vertically within an oval channel in the side walls of the ammo container. The end of the S shape that surrounds the pin pivots upon the pin which allows the spacer to move in an open or closed position. The open end of the S shape hooks onto the side wall of the ammo container or a bearing roller surface. The spacer accommodates larger cans and folds down to become a spacer for smaller size ammo cans. It will help prevent smaller ammo cans from sliding front to back within the ammo box.

The ammo container can utilize a liquid or powder coated paint, a CARC paint, a powder coated rubber material, spray coated bed liner, molded rubber, neoprene, foam, or the like material to prevent vibration, and reduce noise of metal on metal, contact, clanking, rubbing, squeezing, or the like from wearing the surface of container and/or ammo cans.

Roof Rack

The present invention also incorporates the use of a roof rack container designed to stow gear, ammo cans, water, backpacks, MRE's, or the like and other gear utilized in combat. The roof rack can be mounted on top of the roof of a vehicle and may include a planar bottom with angled brackets to mount the contour of the (armored) vehicle. The racks can be produced with metal, aluminum, carbon fiber, plastics, or materials robust enough to handle heavy loads, vibration, and extreme G forces applied upon the rack.

The rack can comprise of square, round, octagon, or the like tubing, C channel, E channel, formed brackets, or extruded formed channels to aid in assembly to produce section that may be locked in one position or adjustable: telescoping in and out to lengthen or widen the size to fit the vehicle when it's mounted on and load it carries. The telescoping allows a 20 inch side or railing to extend up to 38 inches, 30 inch side or railing extend up to 58 inches, 58 inch side or railing extend up to 114 inches in length or width, giving the user one rack that can fit any application or vehicle. The telescoping is preferably set prior to setting out on a mission, the roof rack is preferably telescoped in the direction of the facing vehicle.

Example vehicles for mounting the ammo boxes and features to include: JLTV, M-RAP, MATV, HUMMVVs, Hemmet, PLS, Cougar, pickups Trucks, transport vehicles, vans, trailers, or the like with only changes to mounting system brackets to fit alternate vehicle sizes the frame system can be boiled, welded, molded oi the like to form flame utilizing latches bolts for adjustable locks.

The floor of the roof telescoping roof rack utilizes two floor plates that have perforated ovals, round, square, octagon, or the like holes to prevent water, snow, or the like from staying in rack during use or non-use allowing it to drain which prevents corrosion. The floor plates overlap each other when rack is in the closed or smallest position directly over each other the floor plates can slide with one plate on top, one plate on bottom extended to desired length or width required, then mounted on vehicle. The floor braces can be welded, bolted or the like to two L brackets that overlap each other to move in conjunction with the frame and flow plates for adjustability. The L brackets are fixed to the rails and are welded, bolted, and/or otherwise secured to truss brackets so that the adjustment bolts only need be loosened or latches released to shorten or extend the frame, floor, or truss brackets.

C-Clamp

The (vehicle) may also include mounted C-Clamps or push-down clamps. A formed hinge clamp can be comprised of steel, aluminum, rubber molded, plastics, or materials robust enough to withstand everyday use and secure an object until released. The function of this clamp does not require a spring to open and close, but operates through mild pressure by pulling up and out to release or pressing down and in to close. The three hinge points of the clamp act as a spring, popping the clamp down in a closed position or popping open similar to a spring assisted clamp. A locking mechanism can be applied to the outside of the clamp that once object is secured within and over center, or latch, or the like can lock it, preventing the clamp from being released.

The push down clamp of the present invention utilizes square, octagon, rectangular, round, oval, or the like shape sides with hinges that are in the center splitting the shape in half, and two hinges slightly off center to the base mount. The shaped side walls are welded, bolted, molded, or the like with a hinge on each side of the formed shape that will force the side open or closed by pressing down to lock or pulling up to release, the rotation of the center hinge or molded key acts like a spring to three the two bottom hinge or molded shape side to spring down closed or spring up to release. The top outside of the clamp device can be built with an over center or locking mechanism, lockable or non-lockable latching system so when closed can be latched to prevent release of pioneer tools, spare barrels, extinguishers, tripod, large dismount weapon, Hummer, AXE wrenches, shovel, picks on the like tools wished to lock and hold until needed for a quick release and/or stow for future uses.

Compression device may include compression arm coupled to compression foot for mating with can or other stored item, a compression panel, with buttons to engage compress, or uncompressed/release. Compression may be supplied by compression power device. Container may include a lower containment roller bar that acts to prevent the can from sliding out, but can act as a roller to allow the can, once lifted onto roller bar (after lid open) to maintain weigh of can as can is rolled out. Crank handle may be used to rotate an internal threaded beam or bar that then is used to extend the compression arms/foot, in a similar fashion to a car jack as is known in automotive arts.

Referring now to FIG. 1 in an embodiment of a mounted container, adapted for mounting onto a vehicle, is shown. Container 1 may be referred to as an ammo container, ammunition container, box, container box, etc. or as otherwise known in the art. Container 1 mourns onto a surface with mourning brackets 7. Container 1 is used to store items such as tools, boxes, equipment, or most notably ammunition cams as are known in the art. In FIG. 1, it is shown two cans containing 30 mm rounds are shown in the container. Container includes lid 2 on top of container, side walls 202 on the side of container, and back wall (not shown). Lid 2 will include a top side preferably with sheet metal supported lid welded angled iron for security. Lid may include front top lip 204 to join with over center handle 11 to secure cans, or other material in container, from coming out of front end as exposed shown. Over center handle hinges over hinge points 211 to lift over center handle and thereby raise lid at an angle via hinge tube pin cap bolts 12. Lid may also be held down by hinge spring 8. Hinge for lid may also include hinge tube 14. A hinge support 13 may also be used to support the hinge and lid on container. Container includes bottom side 201 and sides 202 and front 203. In order to access cans within container, over center handle 11 is lifted and thereby clanging position of over center linkage 5 at pivot point for over center handle pivot linkage 6. Once material is safely inside of container and over center handle 11 is closed, an internal compression system can be used to further secure cans within container. In the preferred embodiment, the lid includes compression pad (shown below) that can be lowered onto a surface of the can via a crank. Crank handle 10 is used and is lifted and then rotated to drive a threaded rod (shown below) to cause the pads to drop onto a top surface of cans. Crank handle 10 is held within crank handle 9 to prevent exposure prior to usage. When used, crank handle 10 is lifted from crank handle holder (rotated) to allow manual cranking rotated in a 360° pattern.

As can be seen in reference to FIG. 2, container 1 includes position whereby container is beginning to be accessed whereby lid begins to be lifted. Over center handle 11 is first lifted up rotating around pivot point 211 thereby moving over center handle pivot linkage 6 and lifting over center linkage from container. Optionally, padlock apertures 205 may be included to provide a locking of the lid onto the container.

Figure 38:
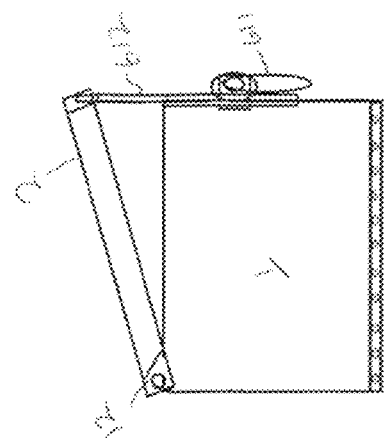
FIG. 38 illustrates a side view of a ratcheting container system in open position of the present invention.

FIG. 3 demonstrates various embodiments of the container. As can be seen in FIG. 8, a dual can version is shown, similar to previous embodiments shown in FIGS. 1 and 2. As can be seen in FIG. 3B, a quadruple container version is shown and as can be seen in FIG. 3C, a single container version is shown. As can be seen in FIG. 3C, the same container 1 includes over center linkage 5 and over center pivot linkage 6 along with over center handle 11 to provide access via lid 2 and front 203 to cans 3 inside container. Mount brackets 7 are shown below bottom surface 201. Flat surface 22 of front container should not include a lip so as to avoiding inhibiting pulling a can out of container directly forward of front end. This embodiment demonstrates an improvement over the prior art containers which include a lip. In the alternative embodiments shown in FIGS. 3A and 3B, a roller tube, or roller rod 21 is included raised slightly above bottom surface 201 and includes a cylindrical rod that can be rolled along axis 221. As shown in FIG. 3A, lid is open at approximately a 70° angle 17 along hinge rod 14. Apertures 15 in the lid can mate with apertures in the side walls 202, apertures 215 embedded therein to provide for locking. Inside latch tube may include handles 16 to provide for access to cans therein. Container side walls 202 may include also a latch cutout 20 in container. As can be seen in FIG. 38, cans 3 sit within container 1. Lid 2 is shown open at a 180° angle 18. Latch tube at handles 16 are shown exposed, and the lid includes cutouts 19 to provide access to release handles.

As can be seen in reference to FIG. 4, an alternative embodiment of a six can container is shown. Six can container 29 demonstrates how six cans 3 can be mounted onto a bottom frame 201 and mounted by a bracket 7 onto a vehicle or flat surface. Cutouts 28 such as oval holes to provide ease of weight on side wall 202. Lid 2 hinge is provided via hinge tube pin 12 and spring 8 with hinge tube rod 14 allowing rotation of lid 2. Further, a hinge support 13 may be used. In this present embodiment, angle bend 26 is provided to cover hinge and spring. Latch 25 is provided through aperture in lid to release lid. A latch pin support cover 27 may be used to secure latch. Crank handle 10 is shown whereby a single crank may operate one or more interior compression devices. In such embodiment, it is contemplated that a single compression device can secure all equipment, or cans, within container wherein preferably all cans include the same height, and a single rod can be lowered onto the top surface of the cans 10 compress and secure them therewith.

As shown in FIG. 5, a mount can be provided. In the present instance, the base frame container mount 31 is provided for access to items in container therein when mounted onto a vehicle. Container mount 31 may include accessory mounts 32 for various accessories used. Base frame container mount 31 is preferably secured via frame mount brackets 33, and may be mounted directly on or hanging off of a roof via roof mount brackets 34. As can be seen, it is preferable in some instances for the container not to include a flat front, but to provide access at various angles, in this instance a preferred layout is an octagon, whereby each of the containers is offset by anywhere from 36°-45°.

As can be seen in FIG. 6, a cutout side view of the container, similar to shown in FIG. 1, is shown. In this view, the side wall 202 is see-through. One can access container 1 via center handle 11. One can access pressure system 240 via crank handle 10. Crank handle 10, and compression system 240, may be mounted on lid. Lid may be lifted along hinge rod 14 with spring 8. In the preferred embodiment, the spring is one of a torsion spring type. In FIG. 6, a partial scissor device is shown. Small arm 38 is attached via adjustment nut 44 to threaded pressure screw 43. Threaded pressure screw 43 can be rotated via crank handle 10 thereby adjusting location of screw adjustment nut 44 can move along channel mount 41, preferably an oval channel for small arm to secure movement when the screw is rotated to lower or raise the pressure device 40. Female threaded nut preferably can slide within the channel. As threaded nut 44 moves toward back 204 of container, small arm 38 is forced to the left, and the end 238 of small arm is lowered within the container. Lowering of end 238 causes pressure to force large arm 39 to rotate at large arm pivot mount 42 to cause foot pad 40 along far end 339 to then secure foot pad lower onto a can within container. Crank arm 10 can be rotated in one direction to provide for lowering of foot pad, and in the alternative direction to allow for raising of foot pad thereby securing via compression, and releasing pressure on item for removal. As used in the present invention, the term compression is a term of art used to refer to a simple pressure that is placed onto a surface. Compression does not necessarily refer to the actual compressing of the device. As a certain pressure is placed onto (for instance the lid of the) can, the can is thereby secured. The compression device does not provide for ease of movement, and therefore defining the space wherein the can exists, and allows for the can to be secured within container.

While FIG. 6 demonstrated the compression device activated and lowered, FIG. 7 demonstrates a very similar embodiment of the compression device is an up or uncompressed position. Compression device will be in the up position to allow for access to cans within and for the act of inserting cans into container. Compression device rotates out of the way and allows for access to interior space of the container 200. As can be seen, large arm 39 is secure close to the top and underside 302 of lid 2. Foot pad 40 is raised higher out of way of the lid and latch system.

Figure 8C:
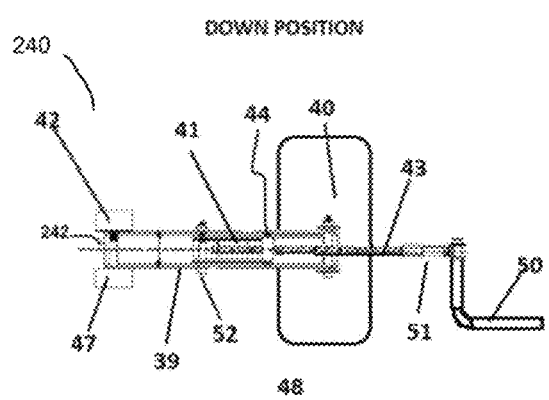
FIG. 8C illustrates a top view of the crank and bar pressure systems of the present invention at engaged status.
Figure 8B:
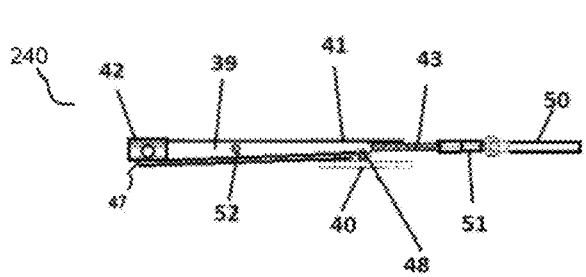
FIG. 8B illustrates a side view of the crank and bar pressure systems of the present invention at unengaged status.
Figure 8D:
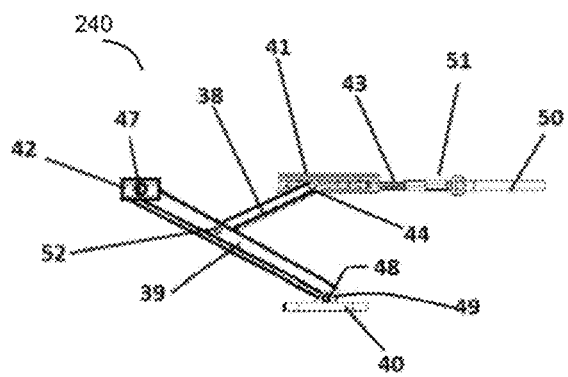
FIG. 8D illustrates a side view of the crank and bar pressure systems of the present invention at engaged status.
Figure 8A:
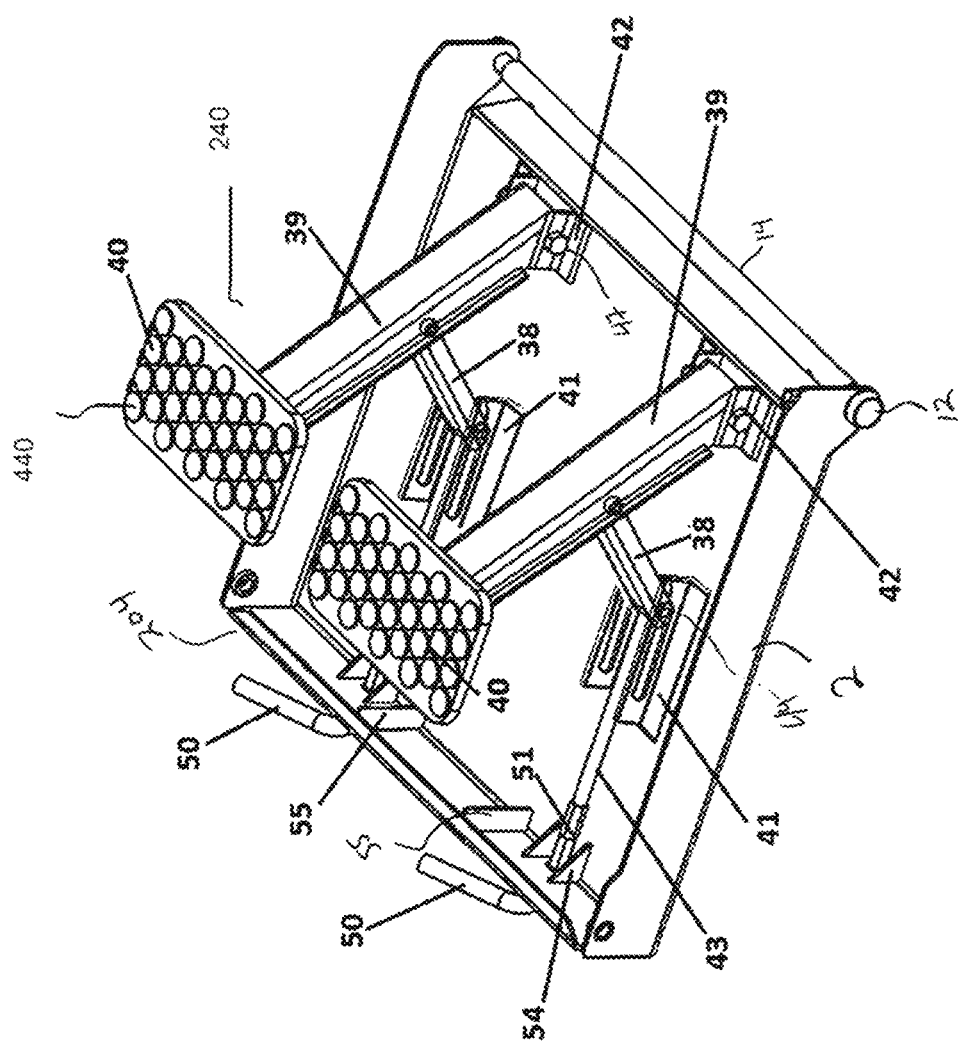
Figure 8B:
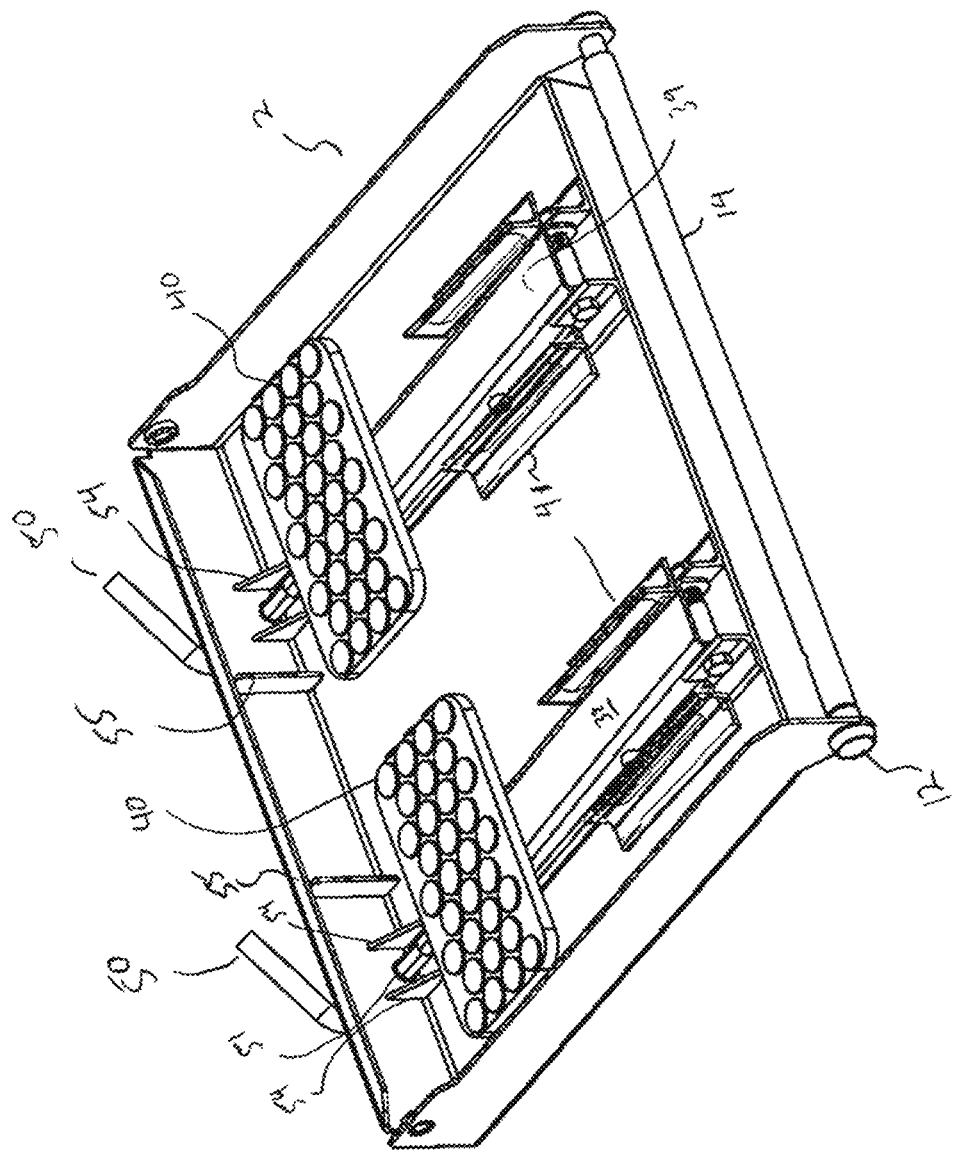
Figure 13C:
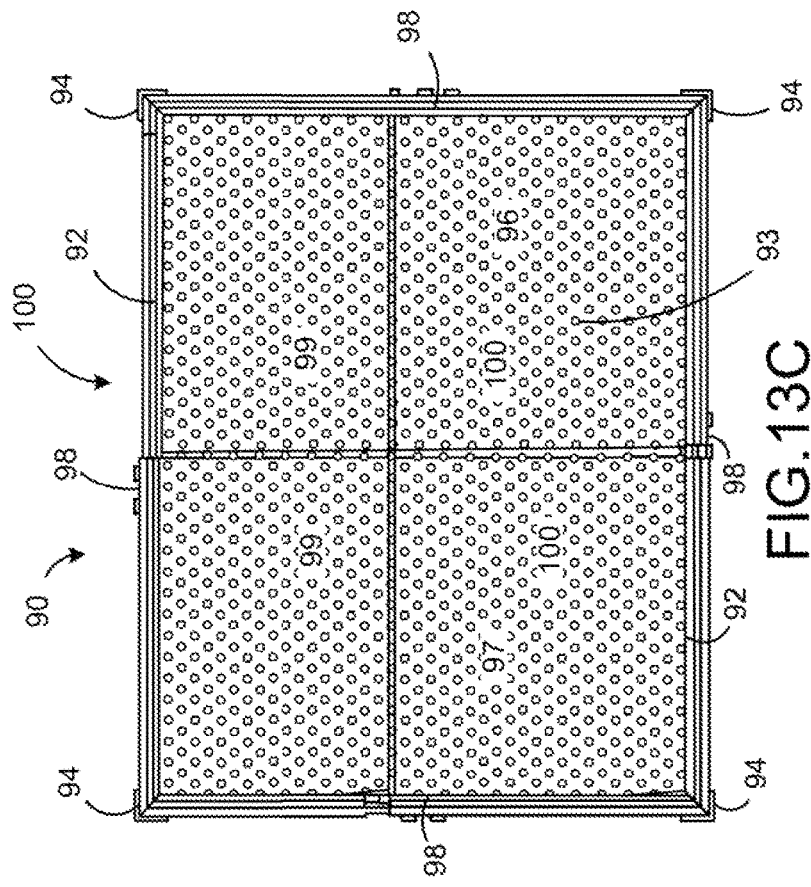
FIG. 13C illustrates a top view of a roof rack embodiment of the present invention in open telescopic sides.
Figure 13D:
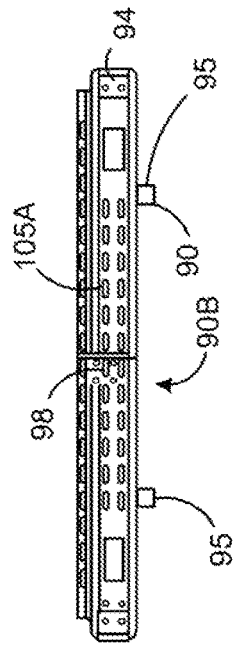
FIG. 13D illustrates a side view of a roof rack embodiment of the present invention in open telescopic sides.
Figure 13A:
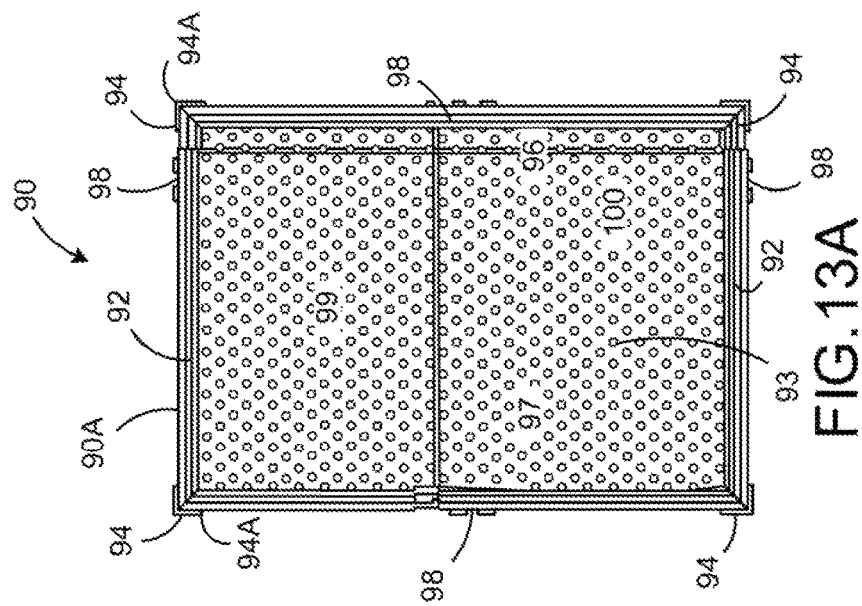
FIG. 13A illustrates a lop view of a roof rack embodiment of the present invention in closed telescopic sides.
Figure 13B:
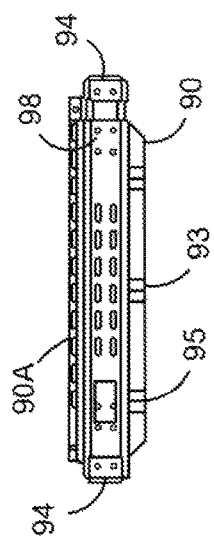
FIG. 13B illustrates a side view of a roof rack embodiment of the present invention in closed telescopic sides.

Further detail of such crank based compression system is shown in FIG. 8 via FIGS. 8A, 8B, 8C, and 8D. FIGS. 8A and 8B demonstrate the compression system in the up for uncompressed position. FIGS. 8C and 8D demonstrate the system in an extended or down, or compressed, position. As can be seen, crank handle 50 is lifted whereby handle portion 250 would be perpendicular the open face 203 (not shown) to allow for rotating crank manually by a soldier in the field (for instance). As crank handle 50 is rotated (not shown), adjustment screw bushing allows for threaded pressure screw 43 to rotate freely therein. As threaded pressure screw 43 rotates, adjustment nut 44 can thereby be moved within channel 41 and cause the compression system to activate. Foot pad 40 is shown in FIGS. 8A and 8B along long arm 39. Long arm 39 can rotate at pivot mount 42 along pivot bolt 47. Adjustment screw bushing long arm and short arm are fixed via joint 52 whereby they can rotate around fixed joint 52 relative one another. Foot pad pivot holt 48 may be supplied along foot pads joined with long arm 39. Furthermore, a torsion spring 49 to provide to push foot pad back and secure the relative orientation of foot pad. As compression system is placed into down position (as seen in FIGS. 80 and 8D), small arm 38 is forced back and down via adjustment nut 44 thereby forcing long arm to rotate downward via pivot bolt 47 and thereby causing foot pad 40 to lower. It is preferred that loot pad 40 will include a bottom surface for mating with a can therein.

As further seen in FIGS. 8AA and 8BB, the compression system can be mounted via channel mount 41 to lid 2. As seen in these FIGS. 8AA and 8BB, the lid is nipped upside down to provide for a viewing of the compression system mounted thereon. Small arm 38 is shown mounted to channel mount 41 via nut 44. Long arm 39 is mounted to lid via large arm pivot mount 42 and connected via pivot bolt 47. The undersurface 440 of foot pad 40 can be seen with a specific surface feature. In this demonstration for illustrative purposes, but not to be limited, the surface includes a number of arrayed circles that may be seen on a rubber overlay. By including a rubber overlay on foot pads 40, the rubber overlay can be compressed and cause friction with a surface of a can (not shown) so as to secure the can therein. Adjustment screw bushing 51 is shown and crank handles 50 are to be placed outside of the lid for access for manual rotation after lid is closed. Furthermore, to support rotation of crank handles 50, supports such as triangular supports 54 can be used on either side of threaded screw 43. Furthermore, larger rectangular supports 55 can be used to secure the integrity of lid to front surface 204.

As seen in FIGS. 9A, 9B, and 9C, an alternative embodiment of the container with multiple internal sections can be seen. FIGS. 9A, 9B, and 9C demonstrate a side view, front view, and perspective view, respectively. The embodiment, shown in FIG. 9, and further described below in FIGS. 10 and 47, include a system with a tray and removable container. In this way, rear removable container 58 can be removed from base tray 59 similar to how a lid might otherwise be removed. When removable container 58 is removed, access to cans stored therein can be provided for via front, top and sides. As shown in FIG. 9A, removable container 58 can be removed from tray base 59. Base mount 65 can secure tray 59 to a vehicle or other surface. Release latches 64 may be used to allow for release of removable container 58 from base 59. A pressure device 61 may be used to secure container to tray. As can be seen more fully in FIGS. 9B and 9C, cans 60 of various sizes can be included. Given the provision of three separate compression devices 340 cans of various sizes can each be secured separately. As can be seen in FIG. 9B, pressure device 340 is in a down, or holding, or compressed situation against cans 60. In any embodiment, a divider wall 62 may be included to provide sectional access to space within container. The divider wall 62 are preferred within a removable ammo container on a base. In addition front lip 301 can be provided at various steps such as 301 and 301A shown in FIG. 9C to allow for various size and depth of items within container. Further, a top tray 63 may be included above compression devices 340 for additional storage. The top may include a crown 266. The crown may provide for storage of additional items thereon, and further include loop holes 66 to provide for tie downs, or other devices, to be secured within loop holes. The top tray would preferably be located on top of a flat surface of the container.

As further seen in FIG. 10, removable container 58 is being removed from base tray 59. Removable container 68 is thereby removed from tray 69 to provide for access to storage therein. Of note, container may include an assembly wheel to ease removal and installation of container onto base tray. Furthermore, a narrow and complementary sized wheel well 74 may be included in the lower surface of base tray 69 to provide for flush mounting of container into tray. Wheel 70 will exceed the lower surface 268 of container 68 and thereby in order to make lower surface 268 mount with base tray surface 269. Wheel well is required to be recessed. Wheel well 74 should be as low as or lower than mounts 65. In some embodiments, a roller tube 72 will be included in the front of the tray. When cans are placed therein, and the container is then removed, the cans can be rotated or lifted slightly so that they rest bristly onto roller tube 70 and thereby can be easily removed providing the weight of the can onto the roller tube and pulled out of tray. Oftentimes, the cans within these containers can be at a very high level and of a very great weight, therefore necessitating ease of removal. Side wall 202 may include weight holes 270 to limit the weight of the overall container. Removable container may also include release latch 71 to mate with complementary features on tray.

As can be seen in FIG. 11, a longer or larger container is shown in line with the containers shown in FIG. 1, etc. In this embodiment, a fold down spacer bar 81 can be used to secure cans in the container, and prevent cans from leaving, or falling out of front face 203. Cans 3 will thereby be secured. Lid 76 of container 75 can be secured and rotated, fid will rotate along hinge 14. A lid hinge stop 80 may be included to mate with a lid hinge boss 281 on container side wall 202. Release handle 77 provides for release in the same way as an over center handle. Latch 79 may be included to secure release handle 77 closed.

As can be seen in the embodiments of FIG. 12, a sliding lid may be provided that allows for access to the front and top of the container. As seen in top left, container lid is secure. At the bottom, the container lid has been slid back in parallel with the bottom surface, and in the top right the lid can then hinge and drop down. Box container 84 includes sliding lid 85. Slide rollers 86 allow for lid to slide along a roller track 87. Lid 85 can thereby be rolled off of the top of the container and out of the way to provide access to the inferior container. A lid latch 88 may be included to prevent sliding of the lid when not required. A lid hinge pin tube 89 may be used to secure the lid 85 closed.

Referring now to embodiments of a roof rack, as can be seen in FIG. 13, roof rack 90 is shown. On left, telescoping roof rack 90 is in condensed form 90A. On right, telescoping roof rack 90 is in expanded form 90B. As can be seen on top left FIG. 13, a top view of roof rack 90 includes an exterior channel 92. Channel is preferably part of an extruded frame and provides channel frames. Channel frames allow for the extension of the roof rack. Roof rack 90 also includes square tube floor trusses on the underside of roof rack 90. Corners 94A include corner trusses 94 to provide support for the exterior corners of roof rack 90 when consolidated or expanded. Roof rack farther includes roof mounts 95 on either end of roof rack in the front and rear. Roof rack includes right and left sliding floor panels 96 and 97, respectively. Alternatively, sliding floor panels may be front and rear. Roof rack includes extruded frame holder plates 98 to contain roof rack panels. Roof rack also includes top floor panel 99 serving as a floor of the roof rack. Floor panel 99 may include features such as an array of apertures as shown to provide for water and other weather drainage. Roof rack may also include a bottom floor panel 100. As can be seen on the right side in expanded form 90B, two panels of roof rack provide for an extended floor base for additional storage capacity.

In an alternative embodiment of roof rack, as can be seen in FIG. 14, roof rack 100 can include square tube inside a two frame 101 and square tube outside frame 102. Square frames provide for rectangular shape of roof rack. Front roof mounts 103 and side roof mounts 104 provide for mounting of both sides 104 and the end 103 to allow for roof rack to be secured and slide open towards rear of vehicle. Roof rack is preferably mounted on top of vehicle. Side roof mounts 104 may be angled to accommodate the orientation of a roof sliding floor plates top and bottom 106 and 107 are provided. As can be seen in the top view on the bottom right of FIG. 14, when roof rack is in condensed form, sliding floor plates top and bottom 106 and 107 are maintained one atop the other. When in expanded form as shown in the top two figures of FIG. 14, plates 106 and 107 are extended and cover a further area. Roof rack includes side roof mounts 104 with sliding channel 110 for providing rails on mounts to slide plates. Furthermore, top tie down rail 111 may be included with holes to provide for securing of products via ties, etc. FIG. 14 includes in counterclockwise starting on top left in expanded top view, a front view, a side view, a top view in condensed from, and on top right a perspective view. Locking apertures 105A can be used to provide a bolt or other fastening device to secure roof rack in a number of secured opening positions from completely condensed partially open and fully open as can be seen in a number of holes in both FIGS. 13 and 14 labeled 105A.

Figure 15B:
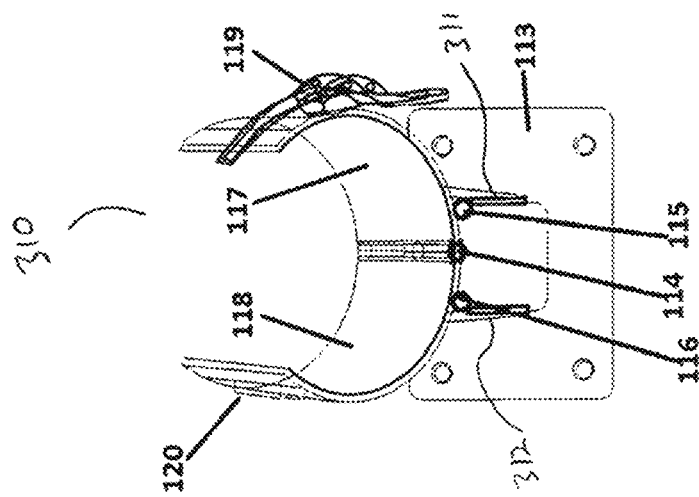
FIG. 15B illustrates a rounded C-clamp embodiment of the present invention in closed position.
Figure 15A:
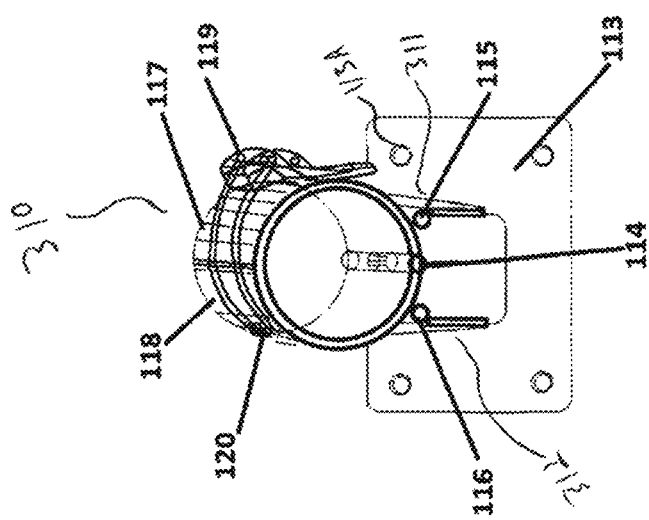
FIG. 15A illustrates a rounded C-clamp embodiment of the present invention in opened and closed position.
Figure 16:
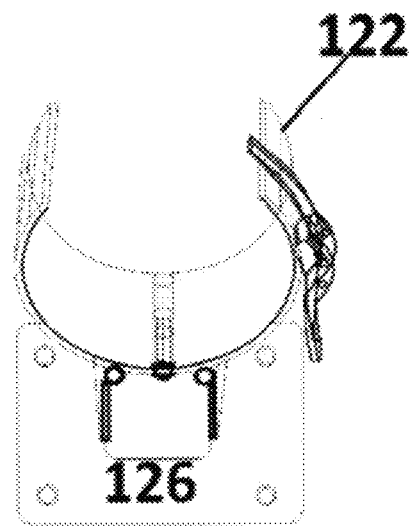
FIG. 16A illustrates a side perspective view of a closed rounded C-clamp of the present invention.
FIG. 16B illustrates a side perspective view of an open rounded C-clamp of the present invention.
FIG. 16C illustrates a side perspective view of closed squared C-clamp of the present invention.
Figure 16:
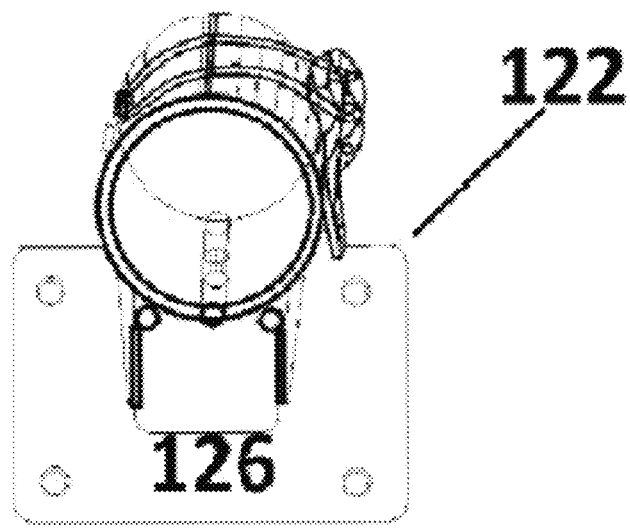
Figure 16:
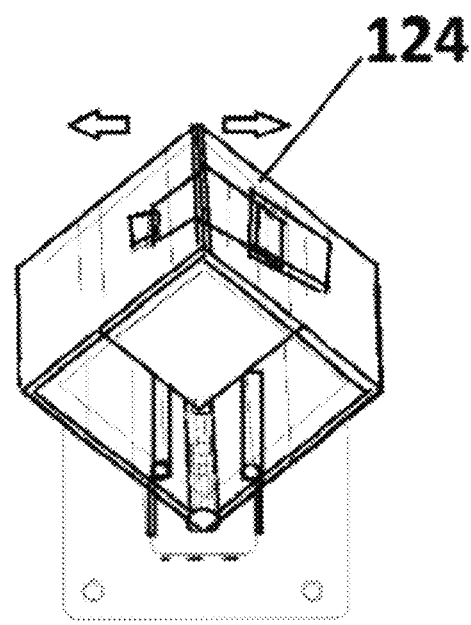
Figure 17A:
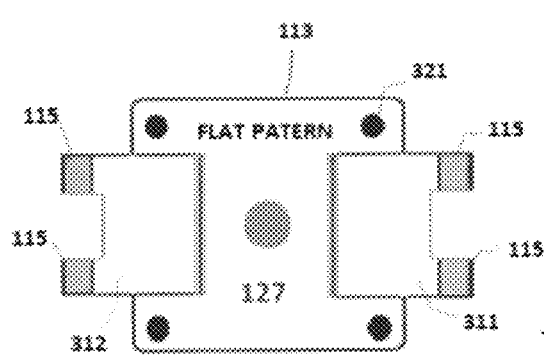
FIG. 17A illustrates a top view of a base mount for C-clamps of the present invention.
Figure 17B:
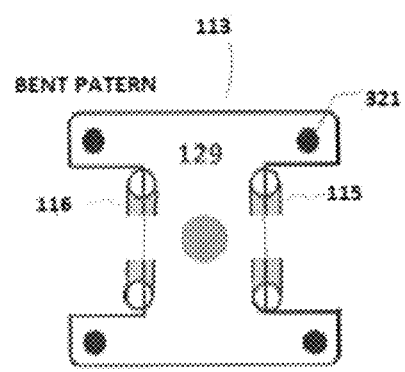
FIG. 17B illustrates a top view of a base mount for C-clamps of the present invention.
Figure 17C:
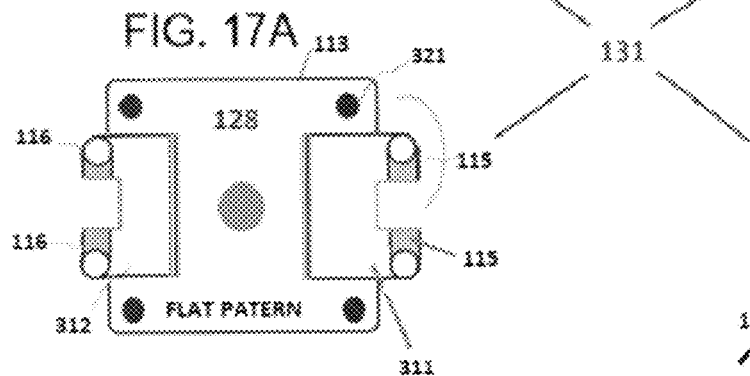
FIG. 17C illustrates a top view of a base mount for C-clamps of the present invention.
Figure 17D:
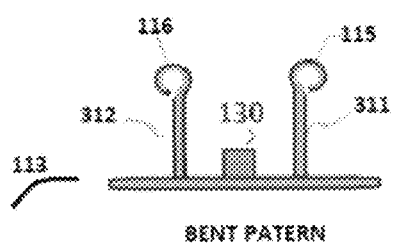
FIG. 17D illustrates a side view of a base mount for C-clamps of the present invention.

Referring now to embodiments of the clamp, or otherwise referred to as C-clamps, refer to FIGS. 15-17. As can be seen in FIG. 15, a C-clamp 310 is shown in closed form left and open form right. C-clamp is formed on mount 113 which can be placed on any solid surface, preferably a flat surface. Most preferably C-clamp will be mounted to a vehicle. Mount 113 includes mount apertures 113A to provide for fasteners into the surface below. Clamp includes two rising plates or walls as shown as plates 311 and 312. Plates 311 and 312 are attached to mount 113. Top of plates 311 and 312 include right hinge 115 and left hinge 116, respectively. Hinges 115 and 116 preferably travel along the length of the top of plates 311 and 312. Attached at hinge 115 and 116 are right and left side halves 117 and 118 which are hingedly coupled to rotate along right and left hinges 115 and 116. Furthermore, right half and left half are coupled to one another via bottom hinge 114. As clamp is used, hinges 115 and 116 remain stationary, while bottom hinge 114 rises in the open position (shown right) and falls in closed position (as shown on left). A fastening mechanism is preferably used to attach right and left side halves when connected. As shown, a latch or snap 119 is included to couple with a complementary feature the latch catch 120. As shown, latch snap 119 is affixed on the outer surface of right side 117 to mate with complementary feature latch catch 120 on left side 118.

As can be seen in various embodiments, as shown on FIG. 16, paired viewings of the latch are shown. In top left, a non-spring clamp is shown with a rounded style clamp 122. As opposed to the feature of FIG. 15, wherein the lower hinge included a spring along bottom hinge 114 biasing the apparatus open, in the embodiment as shown on FIG. 16 no spring is used. All sorts of shapes for the clamp may be used as would be needed for various items to be held in clamp. For instance, the triangle style clamp 124 can be used, a square clamp 123, and a octagon clamp 125 among other shapes for the clamps. As can be seen in FIG. 17, mount and attached plates are shown. Mount 113 in FIG. 17 demonstrates the top use of alternate mounts, and one side view at bottom right. As can be seen or otherwise understood by one having skill in the art, by using two halves hinged to raise plates, the clamp can be self closing. The style of the top of the hinge along plates 311 and 312, those hinges being shown as 115 and 116, provide for a flared pattern that allows for the self clamping mechanism. Center hole 130 includes flared edges, while four corners of the mount shown as 321 are used for mounting onto the surface of the vehicle. Hinges 115 and 116 are curled to provide for flexibility to allow clamp to close.

Referring now to FIG. 18, a perspective view of a container system of the present invention is shown. As shown in FIG. 18, a tailgate system is shown. Tailgate functions as a front end of the container, while a lid is also used. Tailgate includes tailgate door 133, here shown open at 90°, which may be closed by lifting up 90° to provide a front wall. Preferably tailgate will include a hinge 134A and chain or other mechanism to hold in place and limit the opening angle of door, such as chain 134. Chain may also be a scissor arm or other means known in the art. Furthermore, latches 136 may be used to attach door when closed to side walls or otherwise to fixed walls within the container. A pivot latch 137 may be used along pivot latch bar 137A to provide for closing and/or affixing closed with lid 139. As can be seen, lid 139 includes a pressure device 138 (in this case three pressure devices) to provide for secure storage of products placed within container. Each pressure device 138 includes crank arm 10 which may be used to rotate threaded bar 43 and thereby cause arm 239 to force foot 40 down against product placed therein. Hinge 141 attaches lid to container to provide for closing of lid.

Further embodiments of the present invention may include alternative front side and tops. For instance, as seen in FIG. 19, container 1 may include rollup folding arms. In this embodiment, rollup arm on left 242 is shown rolled approximately the length of one of the panels 242A. While the right panel 342 are shown rolled up along track 442 approximately two panels. An alternative sliding door of an embodiment of the present invention may be used, such as that shown in FIG. 22. Here panels 242 provide for the top cover and are rolled up along track 442 in the leftmost direction of the invention. Mounted on hinges 542 each of the panels is rotated upward to allow space for the remaining panels as panels are opened.

The present invention also includes automated, motorized, or otherwise powered lid and pressure systems. While previous embodiments typically demonstrated manual pressure systems and manual lids, either or both opening of the container or activating and deactivating pressure system may be utilized. As can be seen in FIG. 20, container 1 demonstrates lid open at approximately 45°. Lid may include a hook or other aperture 515 to mate with a complementary feature on container wall 515A to provide for padlock locking. In this embodiment, opening of lid is automated via pressure. For instance, control panel 700 may be used. Control panel may include up button 701 and down button 702 to activate a hydraulic cylinder 144 to provide lift. In the alternative, power may be provided by air or pneumatic cylinder, electric screw, or other means known in the art. Power supply 710 provides for electric, or pneumatic, or other hydraulic systems to power lift. Supply line 720 provides for either a signal, power, or other supply to allow for lift mechanism to activate it. As shown in FIG. 21, an alternative system is included with a powered compression system. In this embodiment, double door box 146 provides for container opening lid 2 here shown with various opening angles. Compression system may include a motor 447 that is powered to provide motor drive hinge to cause scissor arms 148 of compression system to force compression down. Alternative compression systems are also shown in FIG. 23. In this embodiment, rather than using pads and scissor arms, a screw jack pressure system is used. As shown, a single foot pad 540 is used against more than one can 3. The screw jack pressure system is shown in a down position at top left whereby loot pad 540 is placed against a top surface of cans, and in an open or uncompressed position 153 where foot pad 540 is not placed against containers. The screw jack pressure device is of the common screw jack systems as would be known in the art. In this case, a screw jack system is mounted on the roof underside of the top panel or lid. Control panel 700 may include various buttons to activate the screw jack compression system. For instance, control panel 700 may include an up button 711 to uncompress a down button 712 to compress and perhaps an indicator 713 to indicate to a user whether or not the pressure system has been activated given that FIG. 23 shows a see-through version whereby the cans may not be visible from the exterior of a closed container. As can be seen in FIG. 24, a turn dial screw system may be used. As shown a turn dial screw in an up or uncompressed position is shown in the top left and in an activated down position 155 placed against a can therein. The turn dial screw is similar to one known in the art. As understood, the current compression systems may include various compression systems used for varied sized objects within a single container. For instance, as shown in FIG. 25, smaller can 3A and medium can 3B, and large can size 3C are shown. To accommodate various sizes, more than one compression system may be applied side-by-side as shown in top left of FIG. 25. A first arm 739 is shown at a medium can height, a middle arm 439 is shown at a lower position while a third arm 539 is shown also at medium position. In the lower right in an up position for a larger container, the arm is shown in a retracted position 639. Given the multitude of compression devices therein when automated compression devices are used, a single control panel 700 may include multitude of buttons, for instance in up buttons 701, 703, and 705 corresponding with the three varied compression arms and down buttons 702, 704, and 706 corresponding to the three arms as well.

Figure 26B:
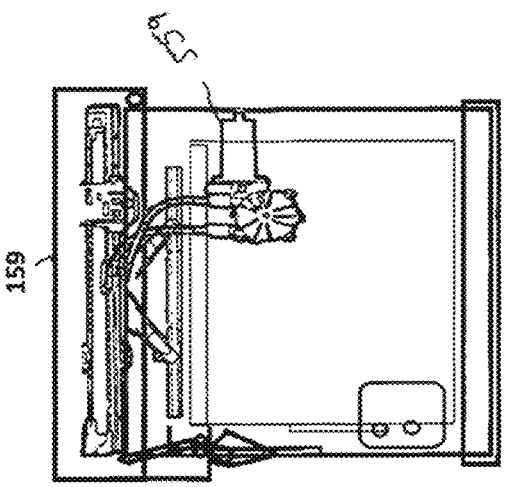
FIG. 26B illustrates a see-through side view of a container of the present invention in uncompressed position.
Figure 26A:
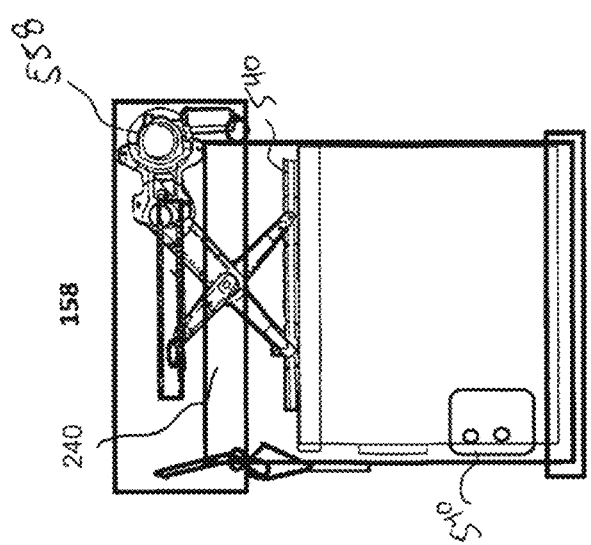
FIG. 26A illustrates a see-through side view of a container of the present invention in compressed positions.
Figure 30A:
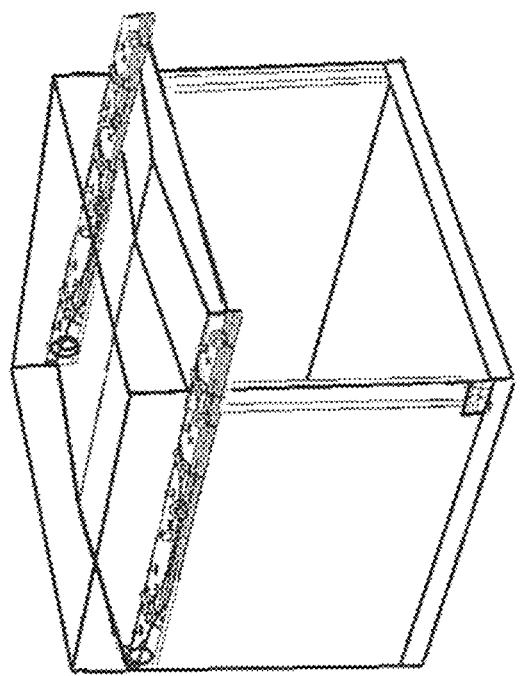
FIG. 30A illustrates a perspective view of a sliding door container in open position.
Figure 30B:
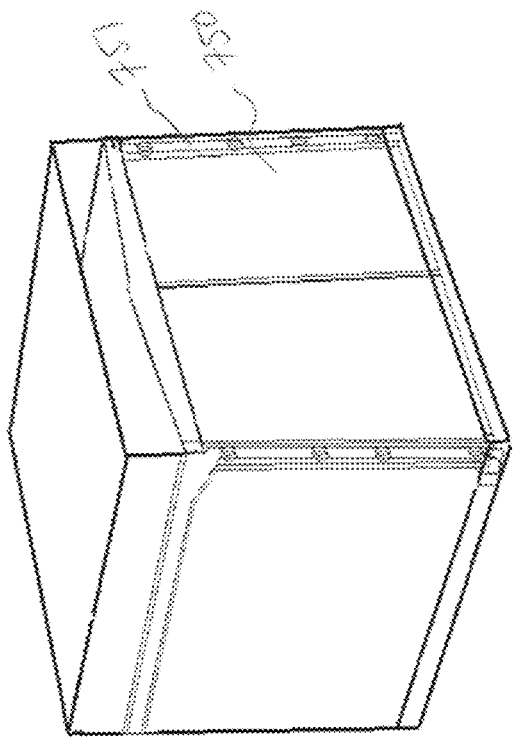
FIG. 30B illustrates a perspective view of a sliding door container in closed position.

Further compression devices are shown in FIGS. 26-29, and FIGS. 31-33. As can be seen in FIG. 26, a scissor compression device may be shown. Scissor compression device 158 provides for automated power via engine 558 to force compression scissor arms down and forcing foot pad 540 against top surface of can. Alternative system such as a hydraulic driven scissor compression device is shown in 159 with compression device disengaged. Either electric or hydraulic may be used in various compression devices here shown both in electric engine 558 and hydraulic press 559. As can be seen in FIG. 27, a pneumatic cylinder may be used to power the lift arm to raise lid 2 of container 1. Pneumatic cylinder 160 provides for pressure on lid thereby opening via up and down buttons on control panel 800. Given that either pneumatic cylinder 160 or hydraulic cylinder 161 may be used, power supply may include power or air or fluid to activate system. For instance, air is supplied by a line 801 to 801A in pneumatic version while fluid may be supplied via hydraulic supply lines 802 and 802A info system. It is contemplated that air or fluid entering system would be under pressure from an outside source. As can be seen in FIG. 28, shown at left is a side partial see-through view including at least two compression devices 630. First compression 630A is an uncompressed and second device 630B is in compressed mode. Hydraulic supply is shown via hydraulic cylinder 631 pressing up rod 632 to force first arm 633 up as arm 633 is attached to rod 632 and further to compression device 630 long arm 634 as rod is raised arm 633 rotates in a counterclockwise motion forcing long arm 634 to engage raising or lowering foot pad. As can be seen at right of FIG. 28, a rear view of the system is shown. In this embodiment, piston 631 forces arm 633 up and down to adjust location of pad. Support beam 650 may be used to secure and support compression device. As shown in FIG. 29, an alternative compression device using an air bladder is shown. Air bladder in this embodiment is not known in the vehicle arts for raising and lowering trusses or frames of vehicles. On left FIG. 29, air bladder compression device is shown in activated and deactivated at top and bottom left. In embodiment 163, container is shown with a compression device below can 3 fixed on bottom of container surface. In the alternative as shown at right in FIG. 29 compression device 664 is shown mounted onto underside of lid. Compression device is activated at top right and deactivated at top left. FIG. 30 demonstrates an alternative sliding front door. Front door 750 slides up along rail 751 from closed position at bottom right to open position at top left in a similar motion to a garage door on track 751 as is known in the art.

As can be seen in FIGS. 31-33, various embodiments of compression devices with side compression are shown. For instance, FIG. 31 demonstrates scissor arms 780 and 781 at right and left, respectively, providing for compression against cans 3 housed within container 1. Alternatively, FIG. 32, an air bladder may be used that is exercised against the side of cans 3 at contact area 803 to secure cans within container air bladders 790 and 791 at right and left are shown. Supply for air bladders is shown via tube 792 supplying air bladders with air for compression and decompression of bladders. Alternative jack side compression system shown in FIG. 33 is similar to those in earlier embodiments whereby root pads are forced against contact area on cans 803 to provide for compression and securing cans laterally within container.

An alternative container fold down holder is shown. In FIG. 34, fold down holder 900 is one that may be used to hold various utensils 901 onto racks 902 to provide for storage on a vehicle. Vehicle 1000 may be mounted via fold down holder mounts 905. Rack may be collapsible as shown at top left in various modes partially collapsed 920 and fully collapsed 930.

Figure 35:
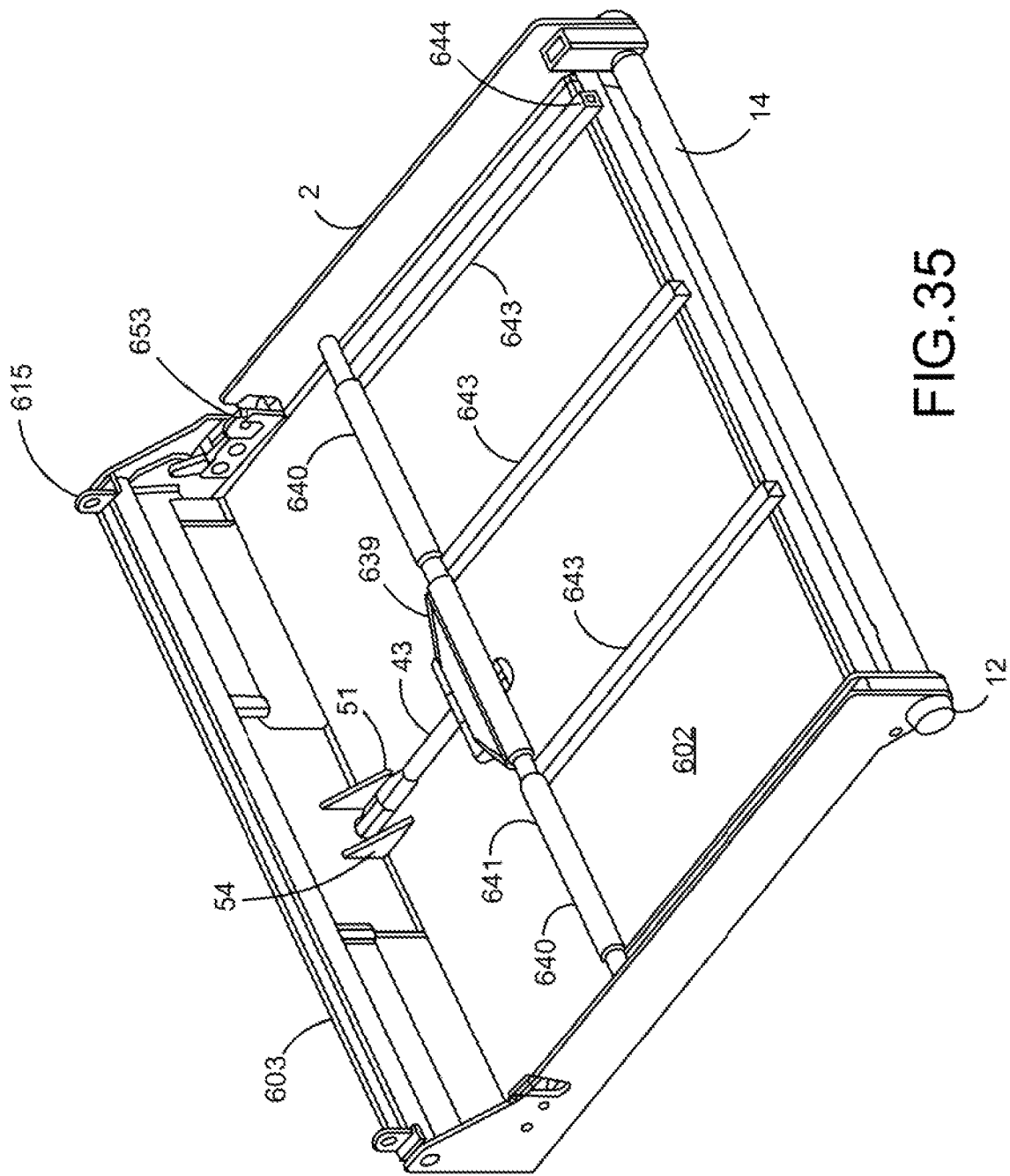
FIG. 35 illustrates a view of the underside of a lid of an embodiment of the present invention.

Referring now to FIGS. 35 and 45, the underside of lid 2 is demonstrated with alternative compression devices. As can be seen, lid is shown in underside perspective is shown. Fool pads may be replaced with a compression bar 640 which may include pads or cozies 641 to provide for interaction with a can placed therein. Threaded bar 43 may be used to modify location of pads 640 so as to move them up and down away from the lid against a can placed therein. Similarly, bushing 51 may be used. Support brackets 54 may be placed on lid between top surface 602 and front surface 603. Lid may include apertures 615 to mate with complementary features in side walls of container to allow for locking via bolt padlock etc. Latch 653 may be used for accessing lid and disengaging lid to allow for opening of lid 2 via hinge bar 14 and hinge tube 12 to rotate lid on container. Compression device further includes tracks 643 that allow movement of fool pads along track. A further arm 649 may be used so that when threaded bar pushes compression system arm 639 causes bar to move along track and separate from lid. As more thoroughly shown in double arm compression lid of FIG. 45, foot pad bar 640 may be mounted onto arms 639 such that arms will rotate in connection with threaded bar 43 along mounted hinge tracks 644. Reinforcement bracket 643 may provide a channel for threaded bar 43 to go through and may terminate in a final bracket 646. As threaded bar is rotated causes pads to rotate at hinge point 644 to provide for application of compression device.

Figure 37:
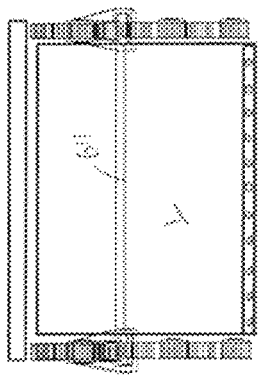
FIG. 37 illustrates a front view of a ratcheting container system of the present invention.
Figure 36:
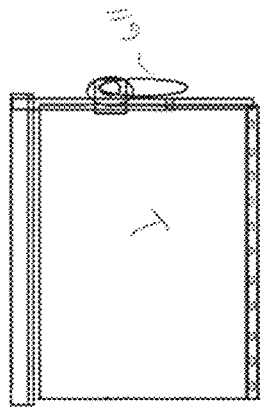
FIG. 36 illustrates a side view of a ratcheting container system of the present invention.
Figure 42B:
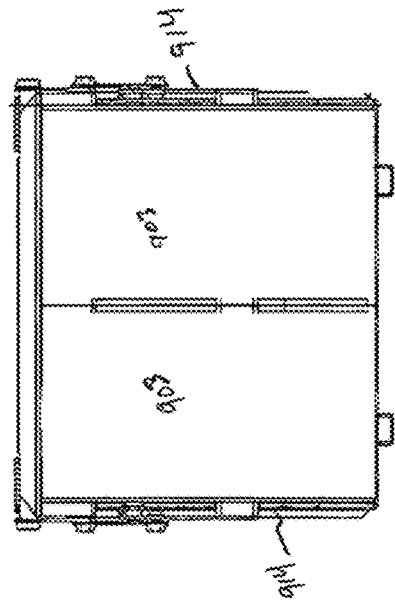
FIG. 42B illustrates a front view of a dual door container system of the present invention.
Figure 42C:
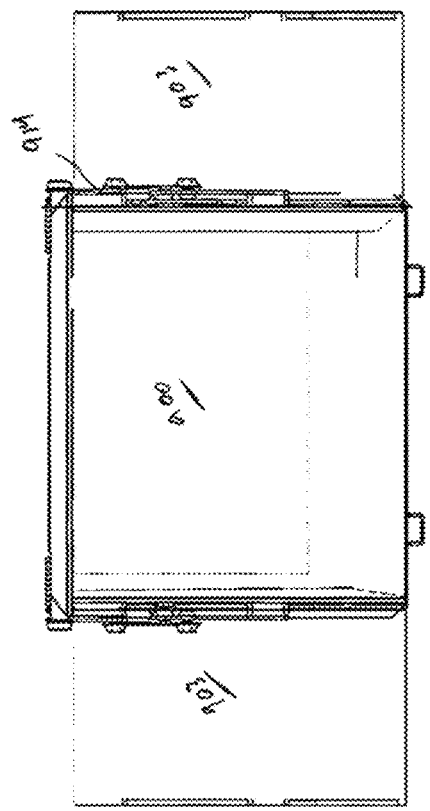
FIG. 42C illustrates a front open view of a dual door container system of the present invention.
Figure 42A:
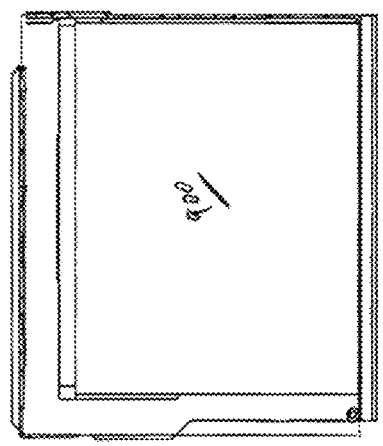
FIG. 42A illustrates a side view of a dual door container system of the present invention.

Alternative ratcheting container lids are shown in FIGS. 36, 37, and 38. Providing a ratchet handle bar 611 can be moved up and down to provide for ratcheting of rack 612 and thereby force lid to rotate from axis 12 to open container. Alternative lid in opening processes are shown in FIG. 39 through 42. As can be seen, container includes lid with single compression system in an up position. Latch 653 is shown to demonstrate lid in closed position. Foot pad 40 may be moved downwards via spring 740 to provide compression against can placed therein. Further side views of a sliding door embodiments are shown in FIGS. 40 and 41. As shown on left, sliding door may be mounted onto top of container and in right bottom container. Top mounted sliding door container 800 provides for door to rotate as shown at bottom left at hinge location 814. As shown in various stages at bottom left, door can be moved from closing to 45°-90° open whereby it is generally parallel with bottom of the container. At that point, sliding door can be slid along track 811 to conceal door 803 within container 800. Wheels 810 may be used to facilitate sliding in track 811. Alternative embodiment 41 demonstrates sliding door with bottom mount. Similarly, container 801 includes door 803. Door 803 may include wheels 810 on side to match track 811. Door is open from closed position at top to semi-open, and open, position shown at bottom. Door is then slid in direction of arrow to the right along track 811. As shown in FIG. 42, side view A, front view B, and front open view C are shown. Door 903 may be hinged at 914 on either side thereby opened to provide access to container 900.

Alternative disk compression system is shown in FIGS. 43 and 44. As can be seen, lid 2 viewed from the underside is shown. FIG. 43A includes the underside flat view, FIG. 43C shows perspective view of underside of lid, and FIG. 43B shows front facing side view of lid 2. Compression device 905 may be a disk compression device. Disk compression device includes various mounted wedges 915 mounted onto underside 930 of lid 2. Alongside wedges 915 are complementary wedges on wheel 940. Wheel 940 rotates around axis 941 to engage complementary sliding wedges. One manner of activating wheel wedge is via moving activation arm 943 along various set compression states designated by holes 945. As arm 943 is moved from left to right, wheel is rotated counterclockwise to engage sliding wedges. As can be further seen in FIGS. 44A, 44B, 44C, and 44D, wheel 905 rotated along axis 941 via movement of wheel arm 943 from left to right provides for activation of compression system whereby wheel is forced away from lid 2 to provide compression. Starting at uncompressed side view of wedge system in FIG. 44D, mounted wedge 915 sits along a surface of lid 2 and wheel wedge 916 rests thereon. As wheel wedge is rotated, as can be seen in FIG. 44C, wheel wedge 916 is moved towards left causing a force against mounted wedge to force the wheel mounted thereon away from lid. In an alternative embodiment, wheel wedge compression device may be activated via a manual wheel mounted on top of lid to provide rotation of wheel well. Alternative manual wheel (not shown) on top of lid may provide a screw adjustment, whereby threaded screw would be positioned directly perpendicular lid surface to cause a pad within system coupled to lid to force down against cans placed therein.

Figure 46:
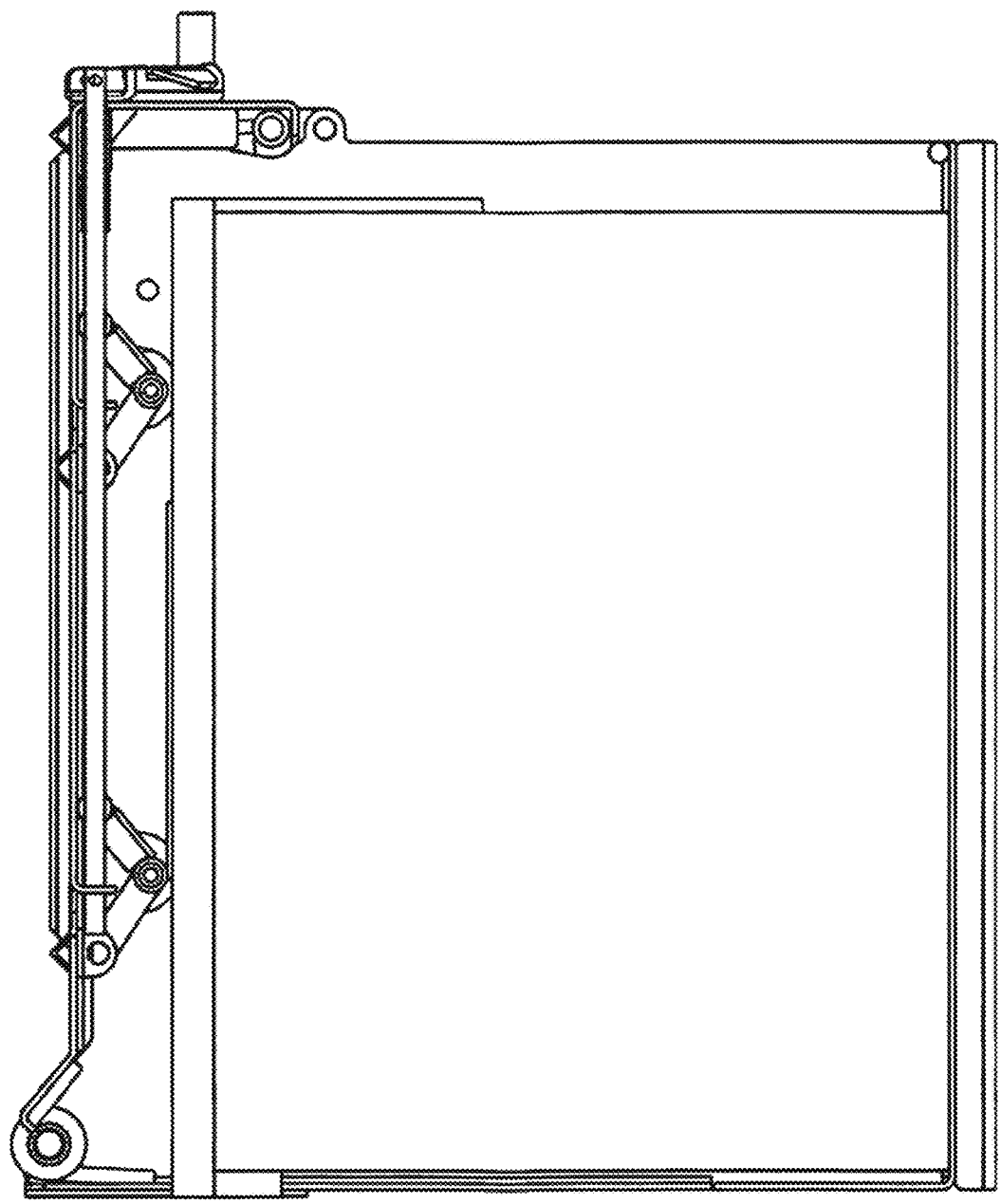
FIG. 46 illustrates a partial cutaway side view of a container embodiment of the present invention.
Figure 53:
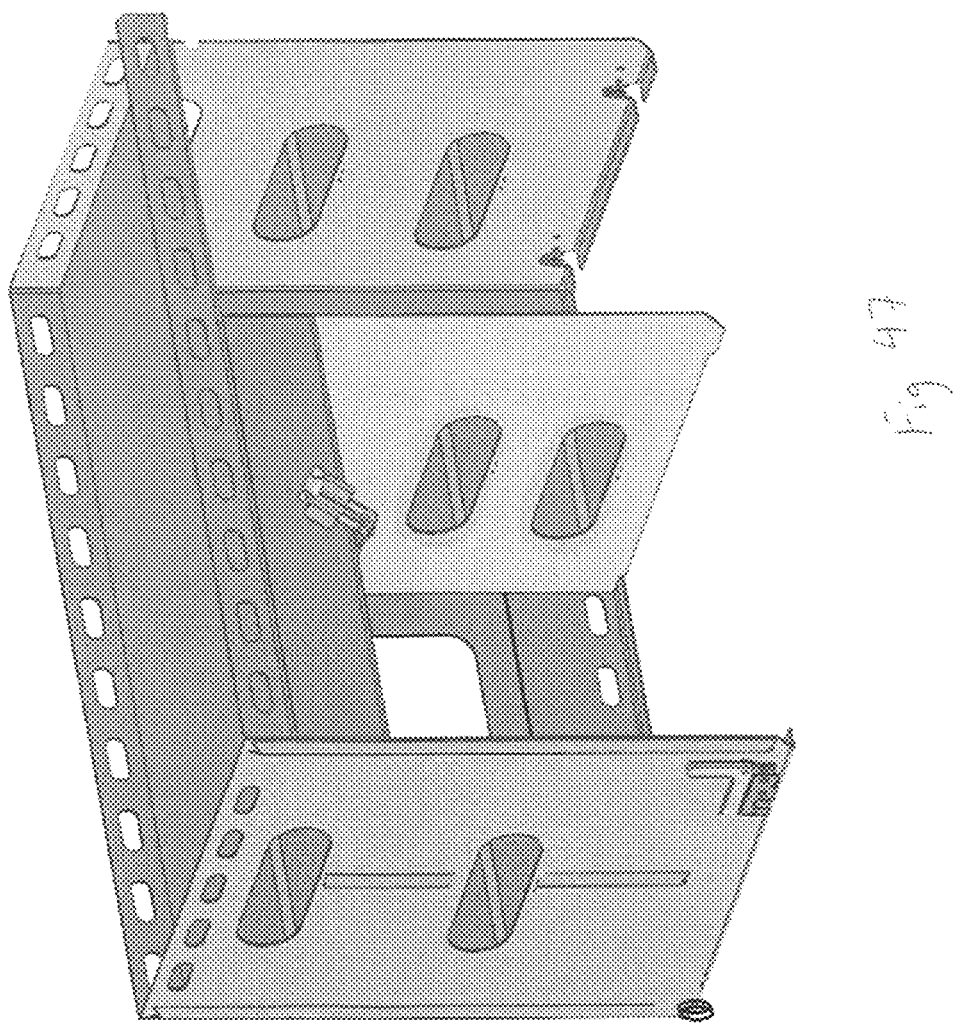

FIG. 46 demonstrates a partially see-through side view of a container with a double arm compression as it otherwise described above. FIG. 47 demonstrates an alternative embodiment of a removable container with wheel and crank arm with divided sections and crown as previously described with further attributes as may be needed. Further, FIGS. 48A-G demonstrates, in order, top view, perspective view, alternative perspective view with door open, perspective view, front view, side view of door, and front view.

While the embodiments set forth, shown, and otherwise described in this disclosure contain matter embodying the present invention, the particular illustrations and embodiments should not be seen as limiting the present invention generally. The present invention includes container systems that may, or may not, be mounted onto a vehicle or other surface. The container systems are used mounted on a vehicle. The container may include various modes of access, security, and mounting onto tray or directly via brackets or otherwise onto vehicle surface. The invention includes various compression devices and systems that will secure the location of items stored within container. The compression systems may be mounted on lid, side walls, bottom, back, or otherwise in the container so as to secure location of items therein. Preferably 5-10 pounds of pressure will be used by compression system to hold matter in place. Rubber gaskets, pads, etc. may be used to capture the compression forces and otherwise provide for friction to hold cans or other items in place. The container may use powered systems to open the container. Power opening systems can include any known in the art including electrical, pneumatic, hydraulic, etc. Control pads may be used to access the container. The container may also be locked by outside locking mechanisms. Furthermore, the compression systems may be operated manually, such as via crank arm, wheel arm, or exterior wheel to provide for compression of items therein. Alternatively, other power sources as known in the art such as hydraulic, pneumatic, electrical, etc. may be used to activate compression devices into compressed and uncompressed systems. Typically when uncompressed container is accessed and an item would be placed therein, container would then be closed, and compression device would, be activated. As compression is activated, either manually or automatically, at the point at which a significant force is felt inhibiting further compression of the compression device (such as upon contact with the can or other item therein), the compression may be completed. When using automated compression, it is contemplated that there will be a sensor to indicate whether or not compression is continuing at predetermined force ranges so as to detect when an item in the container is properly secured.

While these embodiments are meant to illustrate the invention, one skilled in the art should be able to understands the varied advantages of the inventions shown herein. Description of the inventions is generally meant to cover all embodiments, and lack of review of specific elements in later embodiments should not be viewed as limiting the detail required in later embodiments. These and other embodiments comprised in the claimed invention are hereby claimed and should be otherwise understood by one having ordinary skill in the art.

What is claimed:

1. An ammunition container box comprising at least one side, said box adapted to contain at least one ammunition can, said box comprising:
   a. at least one pressure system mounted to the interior of said at least one side, said pressure system comprising a threaded pressure screw driving a first arm, said first arm mounted to said at least one side, said first arm coupled to at least one surface, said at least one surface adapted to mate with an exterior surface of the can;

b. wherein said pressure system adapted to move between at least a first retracted position, and a second extended position wherein said at least one surface extends into space of container to contact an exterior surface of at least one ammunition can;

c. wherein said pressure system comprises a crank handle coupled with said threaded pressure screw, wherein rotating the crank handle and said threaded pressure screw moves said first arm and thereby forces pressure system into extended position;

d. further comprising a second arm that is hingedly coupled to the threaded pressure screw and the first arm so as to allow for manipulation of the orientation of said first arm.

2. An ammunition container box comprising at least one side, said box adapted to contain at least one ammunition can, said box comprising:

a. at least one pressure system mounted to the interior of said at least one side, said pressure system comprising a threaded pressure screw driving a first arm, said first arm mounted to said at least one side, said first arm coupled to at least one surface, said at least one surface adapted to mate with an exterior surface of the can;

b. wherein said pressure system adapted to move between at least a first retracted position, and a second extended position wherein said at least one surface extends into space of container to contact an exterior surface of at least one ammunition can;

c. wherein said pressure system comprises a crank handle coupled with said threaded pressure screw, wherein rotating the crank handle and said threaded pressure screw moves said first arm and thereby forces pressure system into extended position;

d. wherein the threaded pressure screw is mounted onto an underside interior surface of a container lid;

e. further comprising a channel mount mounted on said lid interior surface.

3. An ammunition container box comprising at least one side, said box adapted to contain at least one ammunition can, said box comprising:

a. at least one pressure system mounted to the interior of said at least one side, said pressure system comprising a threaded pressure screw driving a first arm, said first arm mounted to said at least one side, said first arm coupled to at least one surface, said at least one surface adapted to mate with an exterior surface of the can;

b. wherein said pressure system adapted to move between at least a first retracted position, and a second extended position wherein said at least one surface extends into space of container to contact an exterior surface of at least one ammunition can;

c. further comprising a threaded nut set within a channel mounted to an underside of a lid surface, said threaded nut receiving said threaded pressure screw and slidably mounted into said channel.

4. The ammunition container box of claim 3 wherein said threaded nut is hingedly coupled to a second arm, said second arm coupled to said first arm, and movement of the threaded nut causes the second arm to apply forces on said first arm, thus adapted to cause said first arm to move.

5. An ammunition container box comprising at least one side, said box adapted to contain at least one ammunition can, said box comprising:

a. at least one pressure system mounted to the interior of said at least one side, said pressure system comprising a threaded pressure screw driving a first arm, said first arm mounted to said at least one side, said first arm coupled to at least one surface, said at least one surface adapted to mate with an exterior surface of the can;

b. wherein said pressure system adapted to move between at least a first retracted position, and a second extended position wherein said at least one surface extends into space of container to contact an exterior surface of at least one ammunition can;

c. wherein said pressure system comprises interlocking scissor arms mounted to said at least one surface.

\* \* \* \* \*